(12) United States Patent
Gilsdorf et al.

(10) Patent No.: US 10,448,126 B2
(45) Date of Patent: Oct. 15, 2019

(54) TECHNOLOGIES FOR DYNAMIC ALLOCATION OF TIERS OF DISAGGREGATED MEMORY RESOURCES

(71) Applicant: Intel Corporation, Santa Clara, CA (US)

(72) Inventors: Ginger H. Gilsdorf, Chandler, AZ (US); Karthik Kumar, Chandler, AZ (US); Thomas Willhalm, Sandhusen (DE); Francesc Guim Bernat, Barcelona (ES); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 15/639,037

(22) Filed: Jun. 30, 2017

(65) Prior Publication Data

US 2018/0024867 A1     Jan. 25, 2018

Related U.S. Application Data

(60) Provisional application No. 62/427,268, filed on Nov. 29, 2016, provisional application No. 62/376,859, (Continued)

(51) Int. Cl.
*G06F 9/50*     (2006.01)
*H04Q 11/00*     (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); (Continued)

(58) Field of Classification Search
CPC .......... G06F 9/5016; G06F 2212/1016; G06F 2212/601; G06F 3/0631; G06F 9/50; G06F 9/5044; H04L 41/0896; H04L 41/0813; H04L 43/08; H04L 43/16; H04L 67/1012
See application file for complete search history.

(56) References Cited

U.S. PATENT DOCUMENTS 8,788,783 B1 *   7/2014   Karnati ................ G06F 12/084
                                                                               711/118
9,026,765 B1 *   5/2015   Marshak ................ G06F 3/061
                                                                               711/114
(Continued)

*Primary Examiner* — David R Lazaro
(74) *Attorney, Agent, or Firm* — Barnes & Thornburg LLP

(57) ABSTRACT

Technologies for dynamically allocating tiers of disaggregated memory resources include a compute device. The compute device is to obtain target performance data, determine, as a function of target performance data, memory tier allocation data indicative of an allocation of disaggregated memory sleds to tiers of performance, in which one memory sled of one tier is to act as a cache for another memory sled of a subsequent tier, send the memory tier allocation data and the target performance data to the corresponding memory sleds through a network, receive performance notification data from one of the memory sleds in the tiers, and determine, in response to receipt of the performance notification data, an adjustment to the memory tier allocation data.

25 Claims, 25 Drawing Sheets

Related U.S. Application Data filed on Aug. 18, 2016, provisional application No. 62/365,969, filed on Jul. 22, 2016.

(51) Int. Cl.

| | | |
|---|---|---|
| H03M 7/40 | (2006.01) | |
| H03M 7/30 | (2006.01) | |
| G06F 16/901 | (2019.01) | |
| G06F 3/06 | (2006.01) | |
| G11C 7/10 | (2006.01) | |
| H05K 7/14 | (2006.01) | |
| G06F 1/18 | (2006.01) | |
| G06F 13/40 | (2006.01) | |
| H05K 5/02 | (2006.01) | |
| G08C 17/02 | (2006.01) | |
| H04L 12/24 | (2006.01) | |
| H04L 29/08 | (2006.01) | |
| H04L 12/26 | (2006.01) | |
| H04L 12/851 | (2013.01) | |
| H04L 12/911 | (2013.01) | |
| G06F 12/109 | (2016.01) | |
| H04L 29/06 | (2006.01) | |
| G11C 14/00 | (2006.01) | |
| G11C 5/02 | (2006.01) | |
| G11C 11/56 | (2006.01) | |
| G02B 6/44 | (2006.01) | |
| G06F 8/65 | (2018.01) | |
| G06F 12/14 | (2006.01) | |
| G06F 13/16 | (2006.01) | |
| H04B 10/25 | (2013.01) | |
| G06F 9/4401 | (2018.01) | |
| G02B 6/38 | (2006.01) | |
| G02B 6/42 | (2006.01) | |
| B25J 15/00 | (2006.01) | |
| B65G 1/04 | (2006.01) | |
| H05K 7/20 | (2006.01) | |
| H04L 12/931 | (2013.01) | |
| H04L 12/939 | (2013.01) | |
| H04W 4/02 | (2018.01) | |
| H04L 12/751 | (2013.01) | |
| G06F 13/42 | (2006.01) | |
| H05K 1/18 | (2006.01) | |
| G05D 23/19 | (2006.01) | |
| G05D 23/20 | (2006.01) | |
| H04L 12/927 | (2013.01) | |
| H05K 1/02 | (2006.01) | |
| H04L 12/781 | (2013.01) | |
| H04Q 1/04 | (2006.01) | |
| G06F 12/0893 | (2016.01) | |
| H05K 13/04 | (2006.01) | |
| G11C 5/06 | (2006.01) | |
| G06F 11/14 | (2006.01) | |
| G06F 11/34 | (2006.01) | |
| G06F 12/0862 | (2016.01) | |
| G06F 15/80 | (2006.01) | |
| H04L 12/919 | (2013.01) | |
| G06F 12/10 | (2016.01) | |
| G06Q 10/06 | (2012.01) | |
| G07C 5/00 | (2006.01) | |
| H04L 12/28 | (2006.01) | |
| H04L 29/12 | (2006.01) | |
| H04L 9/06 | (2006.01) | |
| H04L 9/14 | (2006.01) | |
| H04L 9/32 | (2006.01) | |
| H04L 12/933 | (2013.01) | |
| H04L 12/947 | (2013.01) | |
| H04L 12/811 | (2013.01) | |
| H04W 4/80 | (2018.01) | |
| G06Q 10/08 | (2012.01) | |
| G06Q 10/00 | (2012.01) | |
| G06Q 50/04 | (2012.01) | |

(52) U.S. Cl.
CPC ...... *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357*

(2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | | |
|---|---|---|---|---|
| 9,335,948 | B1* | 5/2016 | Kirac | G06F 3/0649 |
| 9,984,004 | B1* | 5/2018 | Little | G06F 12/128 |
| 2013/0166724 | A1* | 6/2013 | Bairavasundaram | G06F 9/5016 709/224 |
| 2014/0025890 | A1* | 1/2014 | Bert | G06F 12/0842 711/118 |
| 2014/0337837 | A1* | 11/2014 | Padala | G06F 9/5072 718/1 |
| 2018/0024867 | A1* | 1/2018 | Gilsdorf | G06F 3/0613 709/226 |

* cited by examiner

TECHNOLOGIES FOR DYNAMIC ALLOCATION OF TIERS OF DISAGGREGATED MEMORY RESOURCES

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Different types of memory technology have distinct properties, such as capacity, hardware cost, and latency. For example, volatile memory, such as dynamic random access memory ("DRAM") typically offers relatively fast memory access but is more expensive in terms of bytes per dollar, and as such, is typically available in lower capacities in a compute device. By contrast, non-volatile flash memory (e.g., NAND memory) is less expensive than volatile memory, but is slower than volatile memory.

Real-time applications, such as in-memory databases are experiencing an explosive growth in memory capacity requirements. For example, an average in-memory database spans seven to eight terabytes of memory and others have reached up to 48 terabytes of memory in a single compute device. Given the cost of DRAM, it is beneficial for a workload (e.g., an application or process executed to provide services for a customer) to use only the amount of DRAM required to maintain some minimum guarantee of performance (e.g., the most frequently accessed data should be in DRAM, with other data in a slower type of memory). However, the precise amount of DRAM required is not known prior to execution of a workload, and the optimal amount of DRAM may change over time, as the workload performs different tasks. As such, by equipping a compute device with the peak amount of a particular type of memory (e.g., DRAM) that may be used by a workload at some point in its execution, that memory may be largely underutilized during the majority of the time the workload is executed, leading to wasted monetary resources that could have been invested elsewhere in a data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
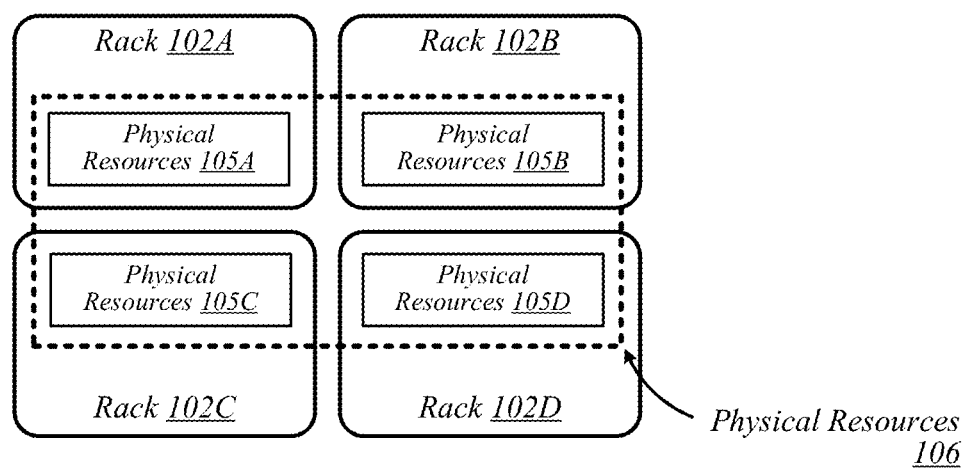
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
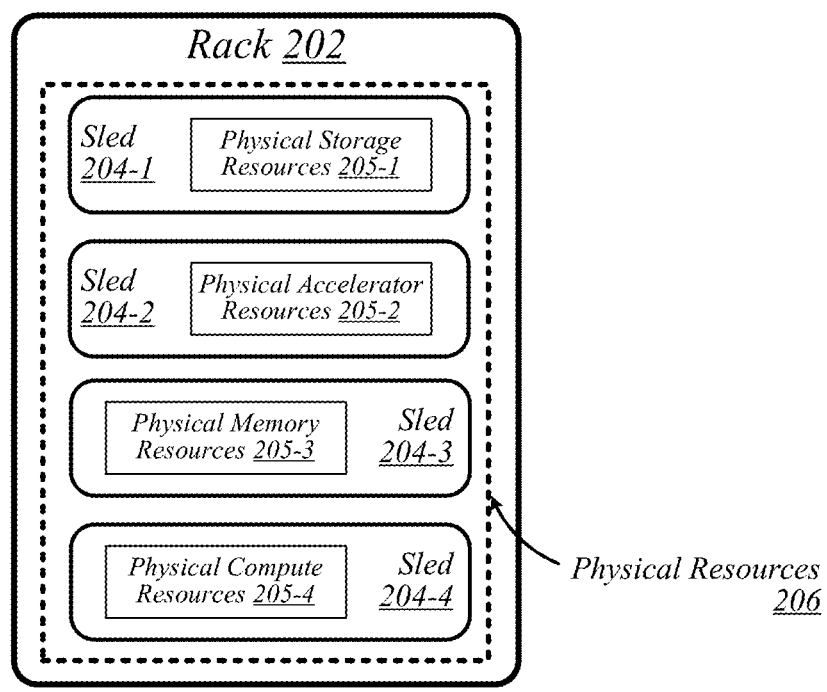
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example.

Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
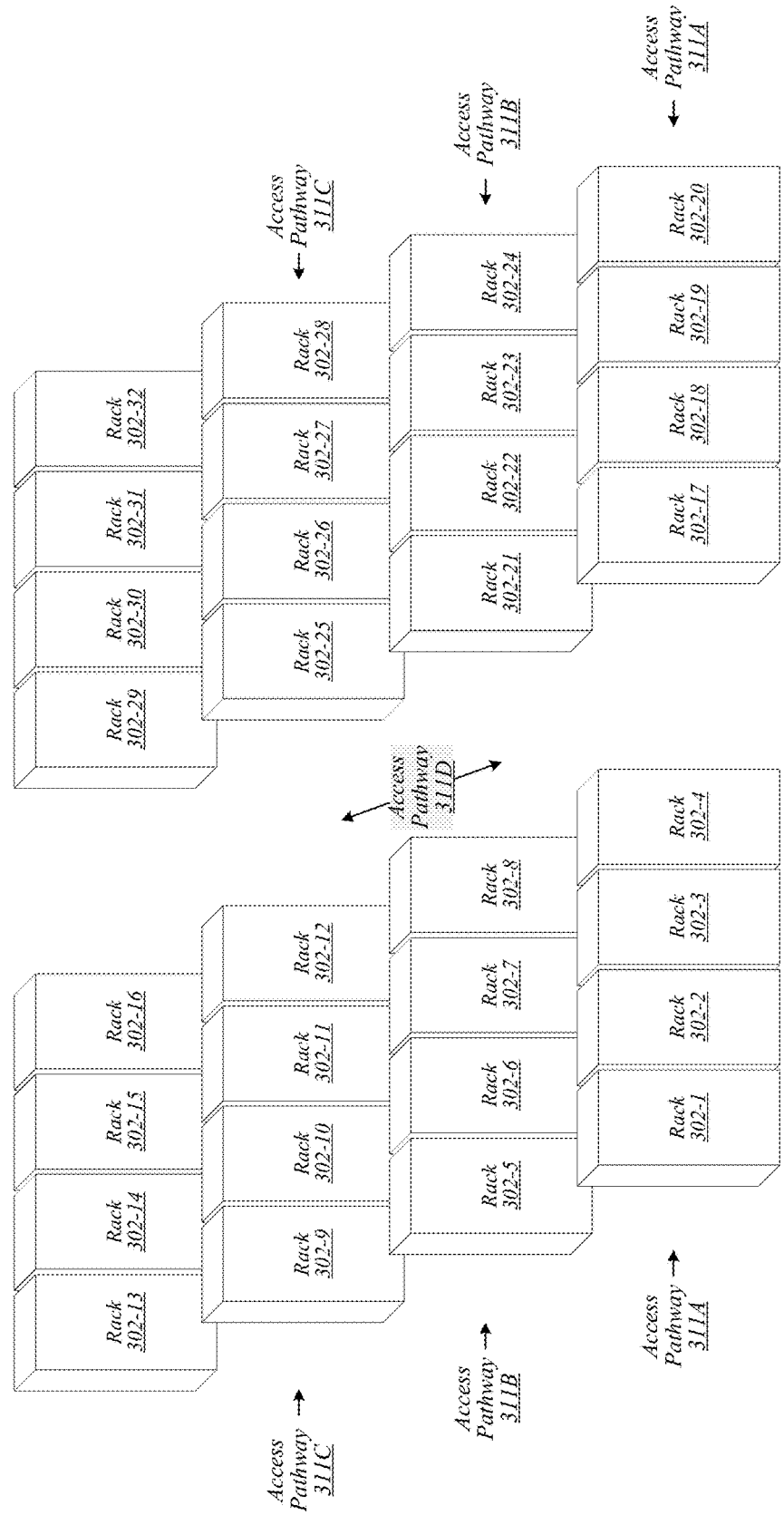
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
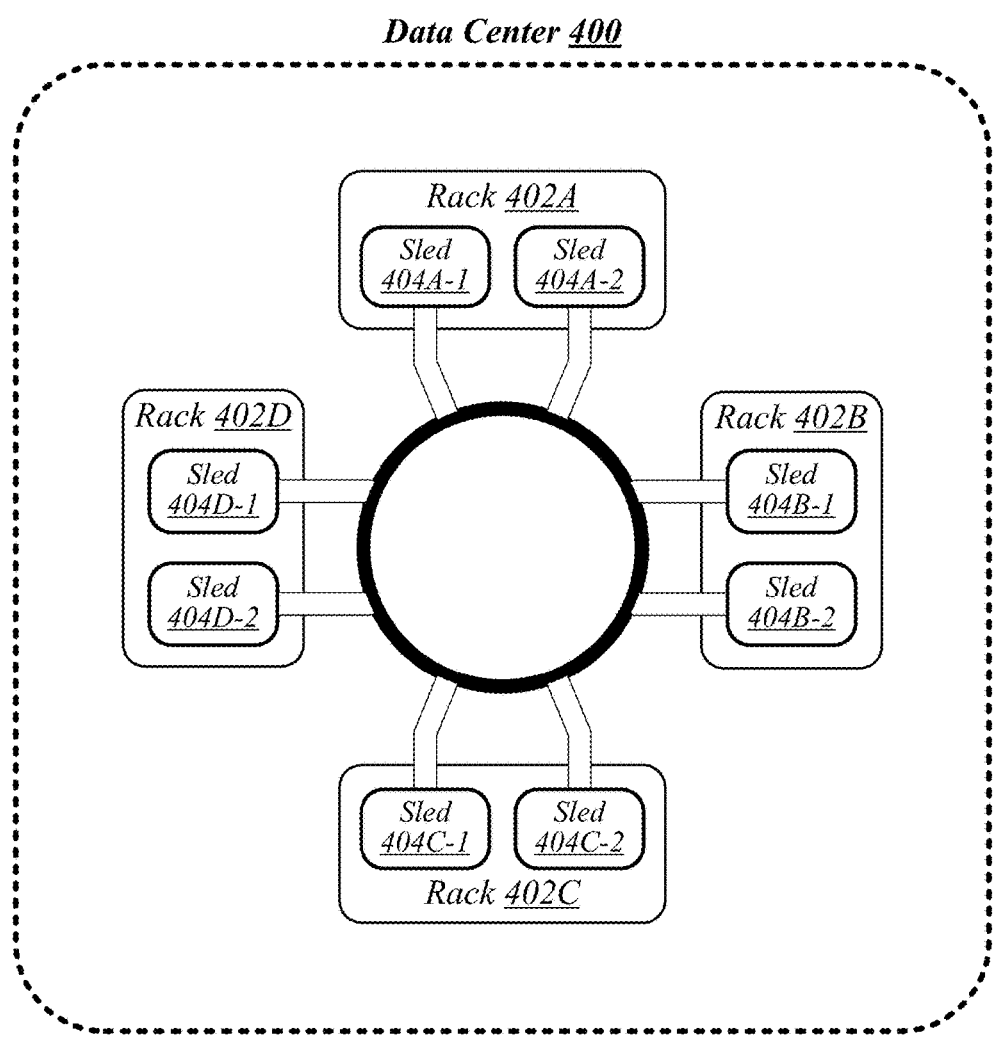
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
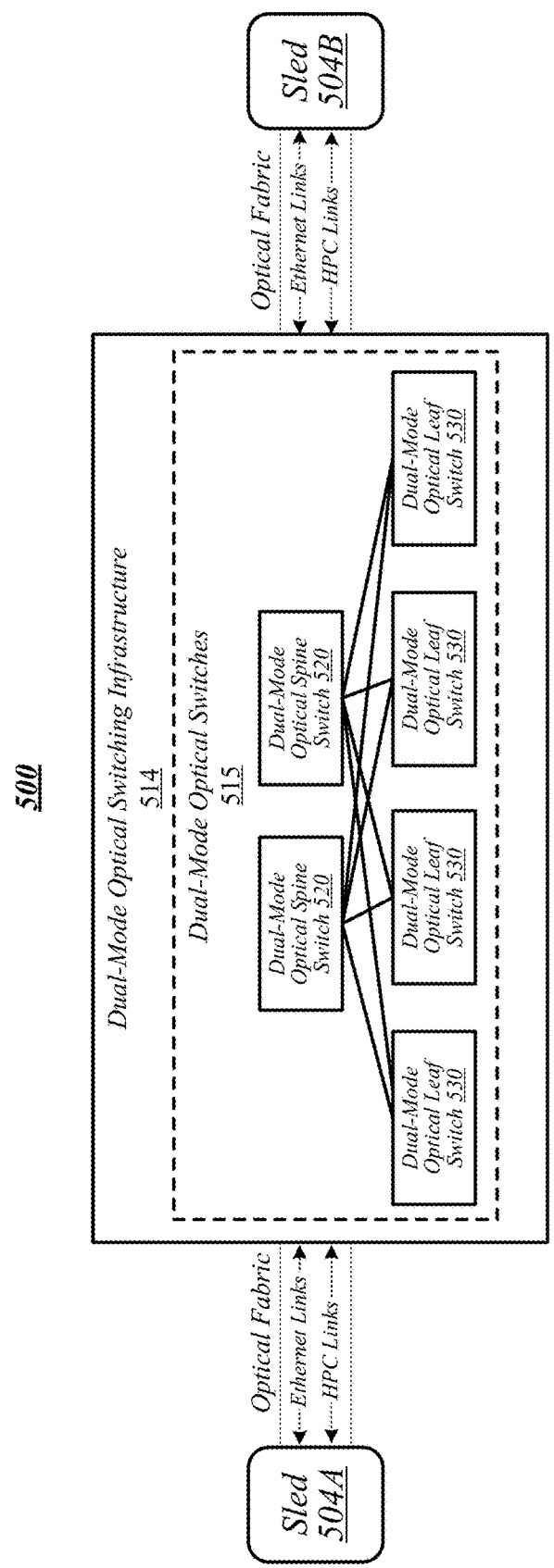
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
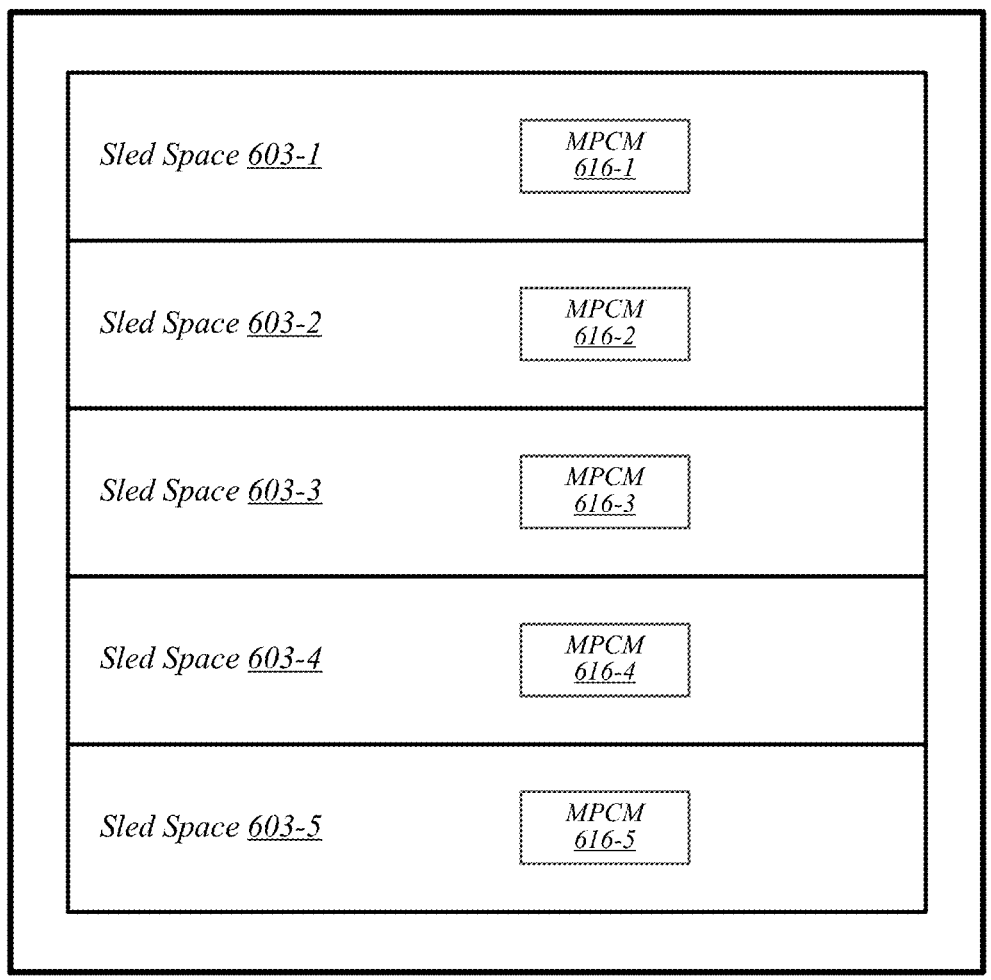
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
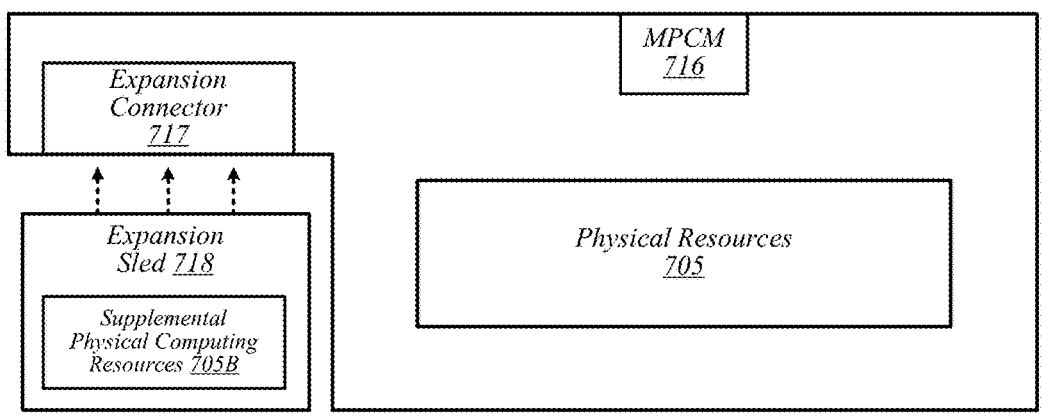
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
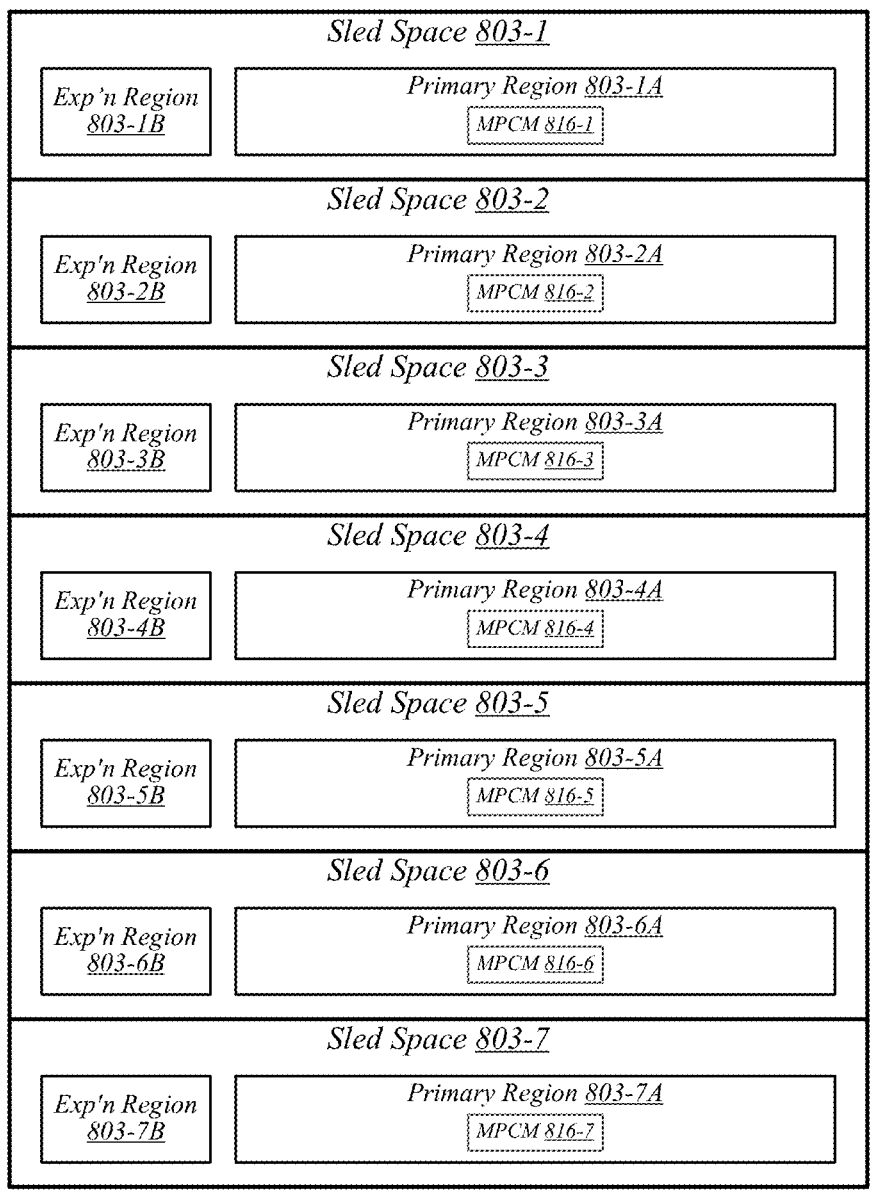
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
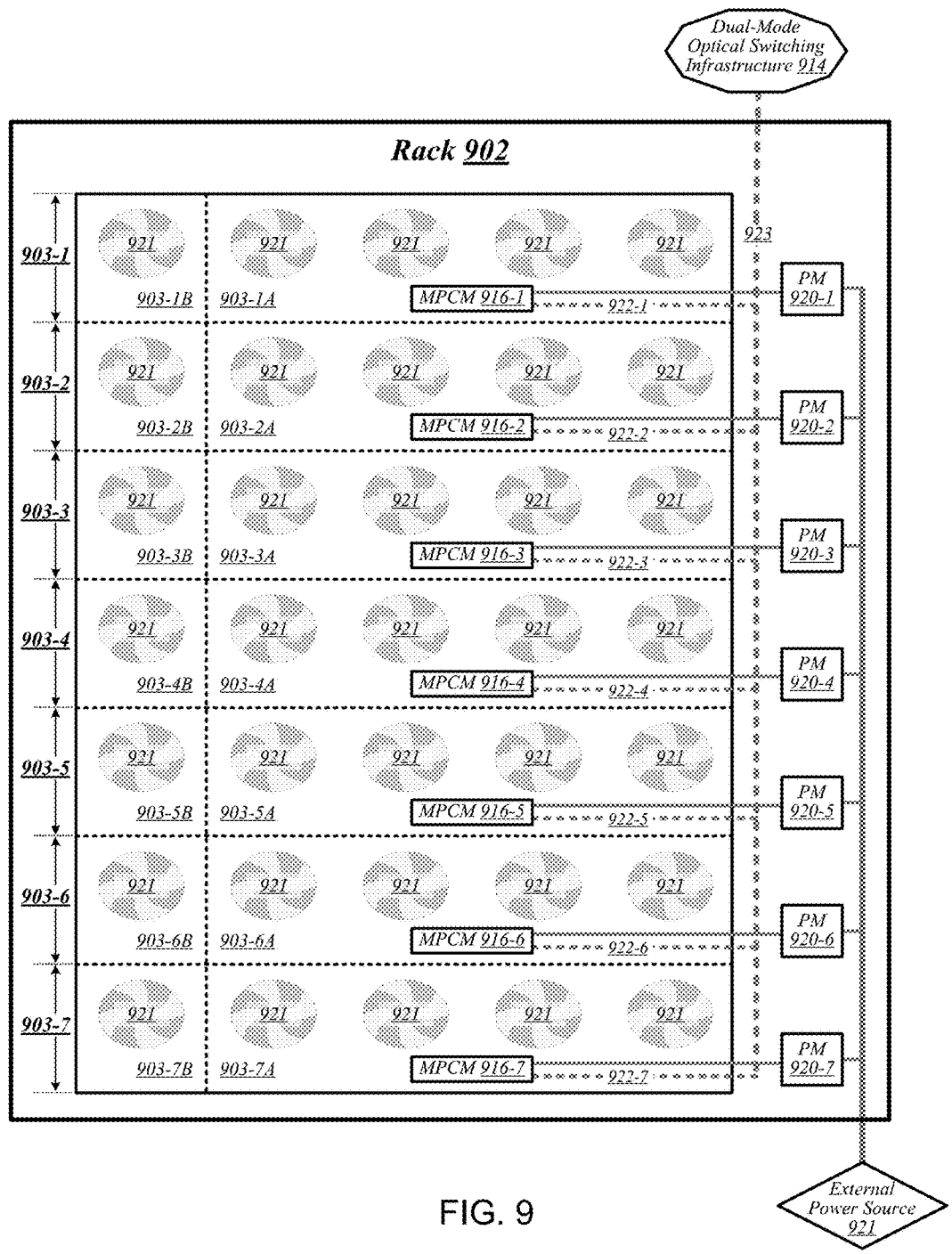
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
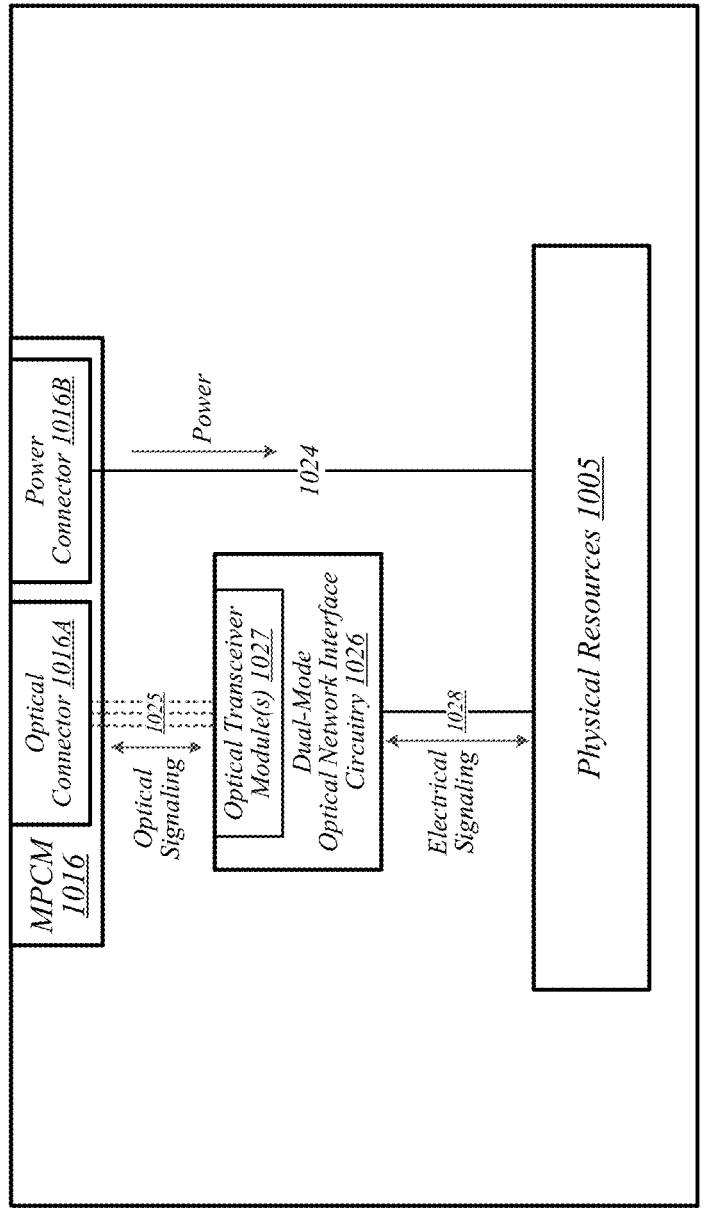
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
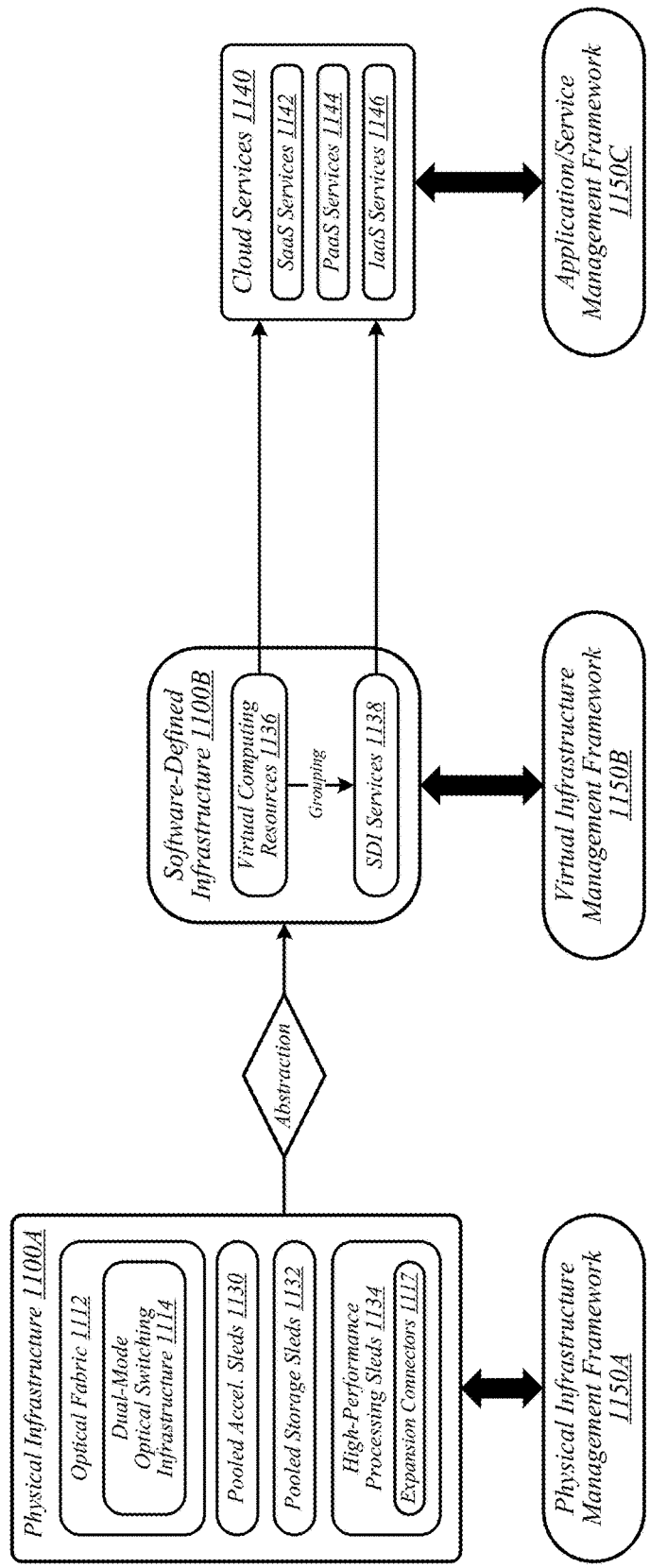
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
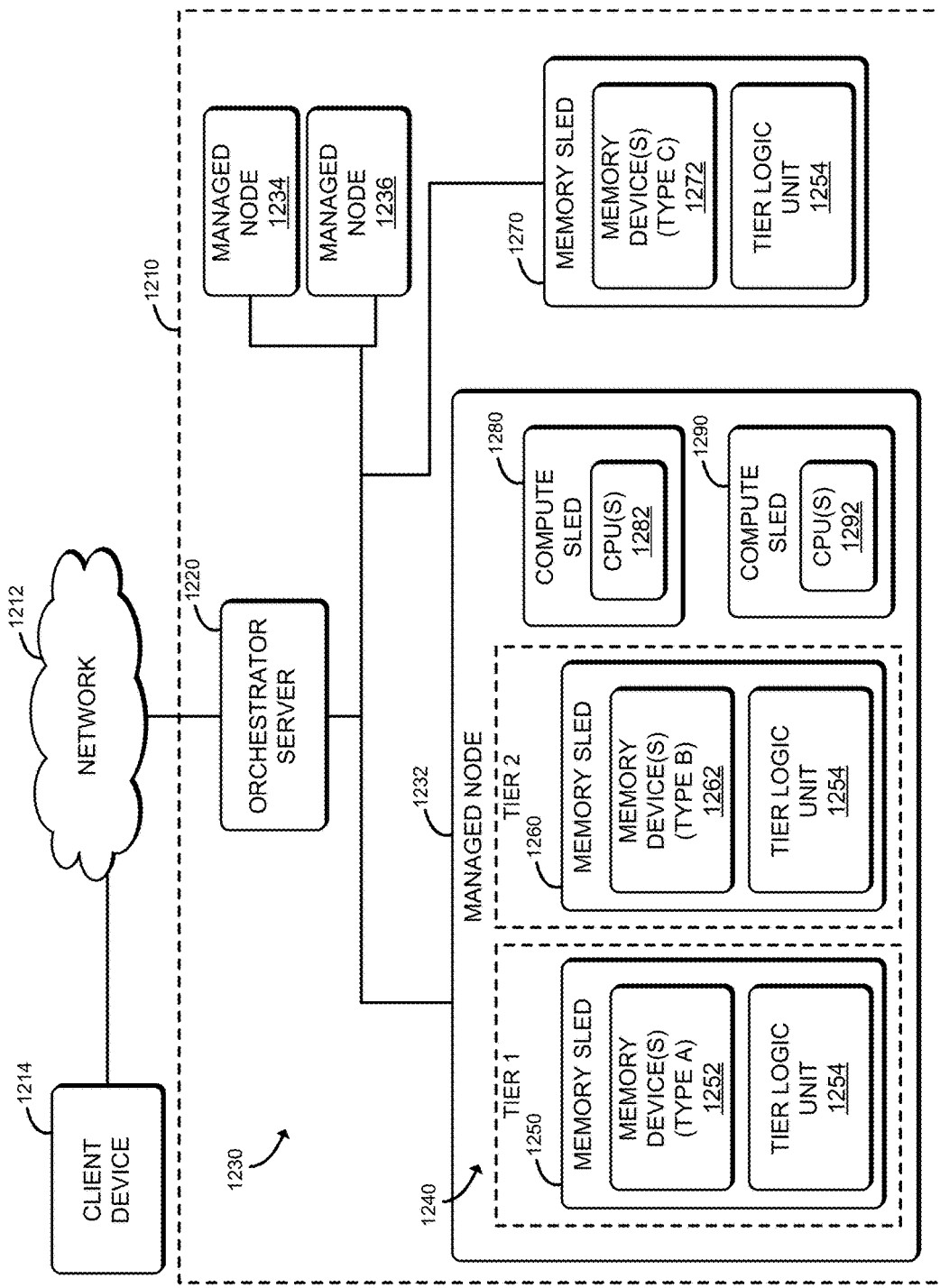
FIG. 12 is a simplified block diagram of at least one embodiment of a system for dynamically allocating tiers of disaggregated memory resources.

Referring now to FIG. 12, a system 1210 for dynamically allocating tiers of disaggregated memory resources may be implemented in accordance with the data centers 100, 300, 400, 1100 described above with reference to FIGS. 1, 3, 4, and 11. In the illustrative embodiment, the system 1210 includes an orchestrator server 1220 in communication with a set of managed nodes 1230. Each managed node 1230 may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Each managed node 1230 may be established, defined, or "spun up" by the orchestrator server 1220 at the time a workload is to be assigned to the managed node 1230 or at any other time, and may exist regardless of whether any workloads are presently assigned to the managed node 1230. In the illustrative embodiment, the set of managed nodes 1230 includes managed nodes 1232, 1234, and 1236. While three managed nodes 1230 are shown in the set, it should be understood that in other embodiments, the set may include a different number of managed nodes 1230 (e.g., tens of thousands). The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and the managed nodes 1230 may execute one or more applications or processes (i.e., workloads), such as in virtual machines or containers, on behalf of a user of the client device 1214.

In the illustrative embodiment, the managed node 1232 may include a set 1240 of memory sleds 1250, 1260 which may be used to temporarily write and read data to corresponding memory devices 1252, 1262, on behalf of workloads executed by CPUs 1282, 1292 of compute sleds 1280, 1290. As described in more detail herein, in operation, the orchestrator server 1220 may establish tiers of memory in which a primary tier, labeled as Tier 1 in FIG. 12, acts as a cache for a secondary tier, labeled as Tier 2, in FIG. 12. The memory devices 1252 in the memory sled 1250 are of a type, labeled as Type A (e.g., volatile memory, such as DRAM), in FIG. 12 that is faster (e.g., lower latency read/write access to the memory) than the memory devices 1262 (e.g., non-volatile memory, such as 3D crosspoint or NAND) of the memory sled 1260. In the illustrative embodiment, and as described in more detail herein, the orchestrator server 1220 may obtain a set of target performance data for a workload (e.g., based on a service level agreement associated with the workload) that indicates thresholds for latency, cycles per instruction, cache misses per thousand instructions, and/or other metrics of performance that are affected by the availability of relatively fast memory to access frequently used data for the workload.

To satisfy the performance thresholds in the target performance data for each workload, the orchestrator server 1220 may selectively allocate the memory sleds 1240 to the tiers according to a scheme in which in each subsequent tier, the memory is increasingly slower, cheaper, and higher capacity than the previous tier, such that the primary (e.g., first tier) provides cache for a subsequent tier. Additionally, the orchestrator server 1220 may continually adjust the allocations as the orchestrator server 1220 receives performance notifications from the memory sleds 1240 indicative of whether the performs thresholds are being met. In doing so, the orchestrator server 1220 may swap one memory sled (e.g., the memory sled 1260) for a tier (e.g., Tier 2) with another memory sled (e.g., a memory sled 1270) which has a different type of memory devices 1272 and was previously not included in the managed node 1232. Additionally, as explained in more detail herein, the memory sleds 1240, in the illustrative embodiment, each include a tier logic unit 1254, which may be embodied as any device or circuitry such as a field programmable gate array (FPGA) or specialized processor, capable of monitoring the performance of the memory devices on the corresponding memory sled 1240, determining whether the performance thresholds are being satisfied (e.g., within a predefined percentage of the performance threshold), learning patterns of phases of the workloads and the demands of each phase (e.g., volume of memory access requests) on the memory sled 1240, predicting the upcoming demands on the memory sled 1240 as a function of learned patterns of the phases, and notifying the orchestrator server 1220 of the effects of the present and/or predicted demand on the performance of the memory sled 1240, to allow the orchestrator server 1220 potentially adjust the memory tier allocation ahead of time (e.g., before the performance is adversely affected by a workload phase change).

Figure 13:
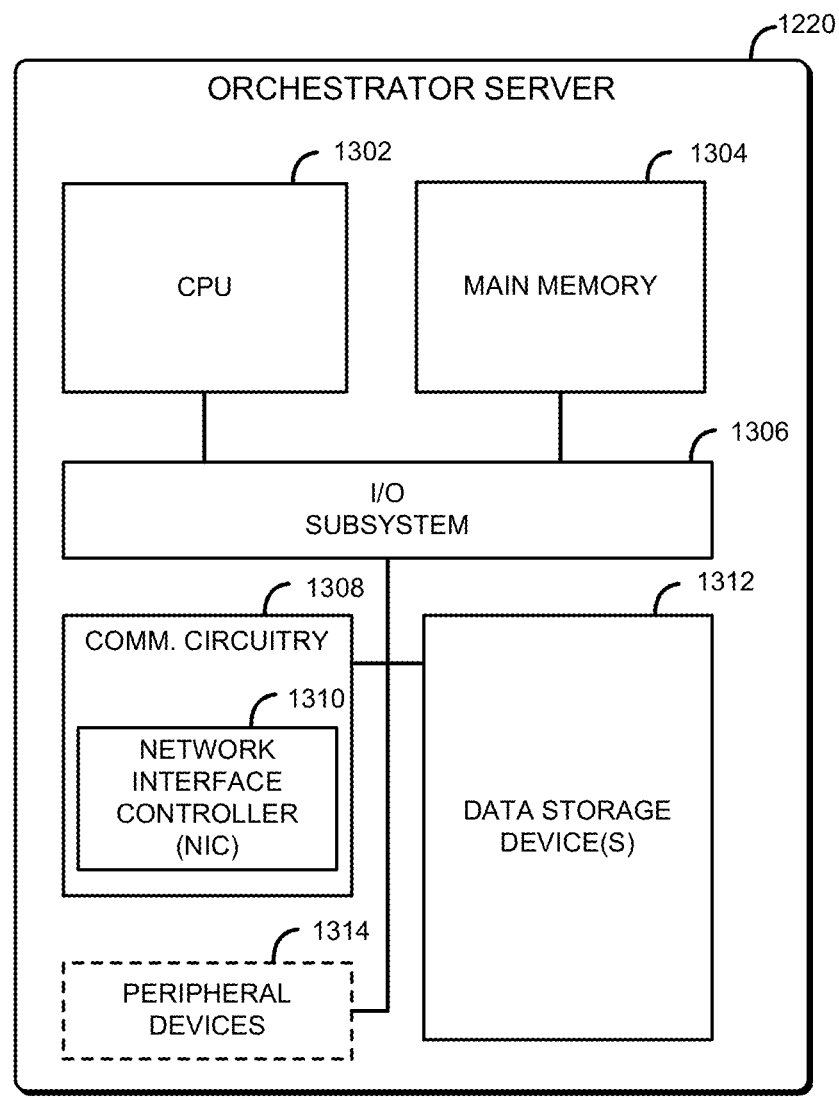
FIG. 13 is a simplified block diagram of at least one embodiment of an orchestrator server of the system of FIG. 12.
Figure 14:
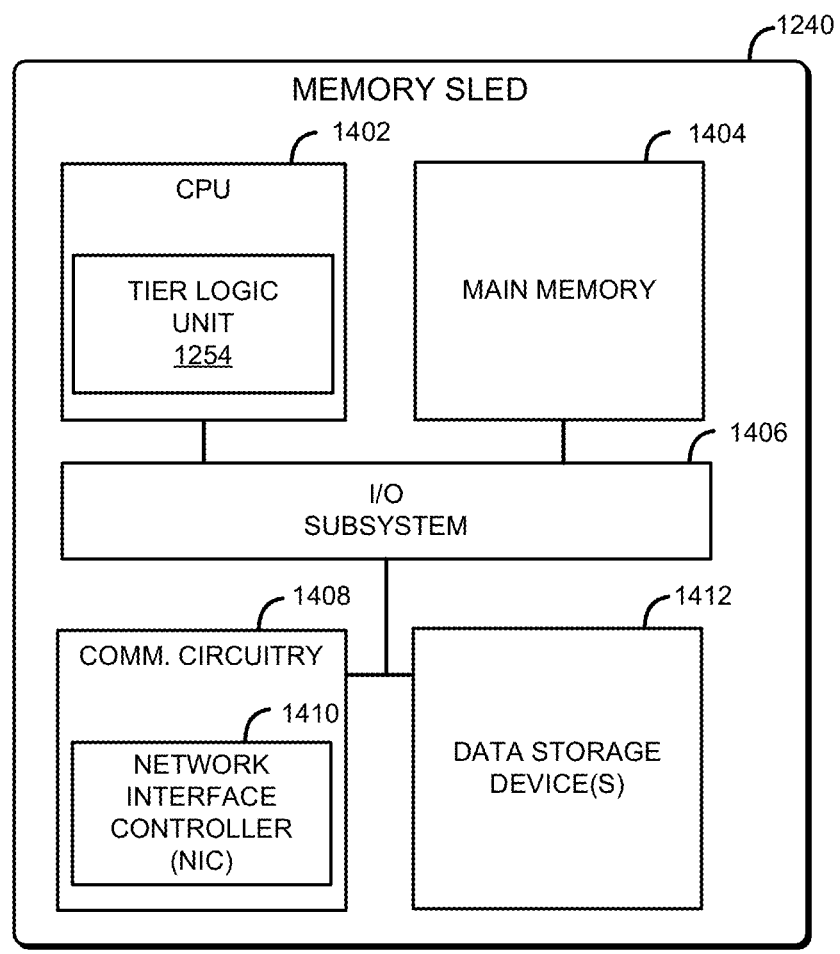
FIG. 14 is a simplified block diagram of at least one embodiment of a storage sled of the system of FIG. 12.

Referring now to FIG. 13, the orchestrator server 1220 may be embodied as any type of compute device capable of performing the functions described herein, including issuing a request to have cloud services performed, receiving results of the cloud services, assigning workloads to managed nodes 1230, and dynamically allocating tiers of memory to satisfy performance thresholds for workloads (e.g., without overperforming or underperforming relative to the performance thresholds). For example, the orchestrator server 1220 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 14, the illustrative orchestrator server 1220 includes a central processing unit (CPU) 1302, a main memory 1304, an input/output (I/O) subsystem 1306, communication circuitry 1308, and one or more data storage devices 1312. Of course, in other embodiments, the orchestrator server 1220 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation such as workload data, target performance data, memory tier allocation data, performance notification data, operating systems, applications, programs, libraries, and drivers.

The I/O subsystem 1306 may be embodied as circuitry and/or components to facilitate input/output operations with the CPU 1302, the main memory 1304, and other components of the orchestrator server 1220. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the orchestrator server 1220, on a single integrated circuit chip.

The communication circuitry 1308 may be embodied as any communication circuit, device, or collection thereof, capable of enabling communications over the network 1212 between the orchestrator server 1220 and another compute device (e.g., the client device 1214, and/or the managed nodes 1230). The communication circuitry 1408 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughter cards, network interface cards, controller chips, chipsets, or other devices that may be used by the orchestrator server 1220 to connect with another compute device (e.g., the client device 1214 and/or the managed nodes 1230). In some embodiments, the NIC 1310 may be embodied as part of a system-on-a-chip (SoC) that includes one or more processors, or included on a multichip package that also contains one or more processors. In some embodiments, the NIC 1310 may include a local processor (not shown) and/or a local memory (not shown) that are both local to the NIC 1310. In such embodiments, the local processor of the NIC 1310 may be capable of performing one or more of the functions of the CPU 1302 described herein. Additionally or alternatively, in such embodiments, the local memory of the NIC 1310 may be integrated into one or more components of the orchestrator server 1220 at the board level, socket level, chip level, and/or other levels.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

Additionally or alternatively, the orchestrator server 1220 may include one or more peripheral devices 1314. Such peripheral devices 1314 may include any type of peripheral device commonly found in a compute device such as a display, speakers, a mouse, a keyboard, and/or other input/output devices, interface devices, and/or other peripheral devices.

The client device 1214 and the managed nodes 1230 may have components similar to those described in FIG. 13. The description of those components of the orchestrator server 1220 is equally applicable to the description of components of the client device 1214 and the managed nodes 1230 and is not repeated herein for clarity of the description. Further, it should be appreciated that any of the client device 1214 and the managed nodes 1230 may include other components, sub-components, and devices commonly found in a computing device, which are not discussed above in reference to the orchestrator server 1220 and not discussed herein for clarity of the description. As discussed above, each managed node 1230 may include resources distributed across multiple sleds and in such embodiments, the CPU 1302, memory 1304, and/or communication circuitry 1308 may include portions thereof located on the same sled or different sled.

Referring now to FIG. 14, each memory sled 1240 may be embodied as any type of compute device capable of reading and writing data to local memory (e.g., physical memory resources 205-3) of the memory sled 1240, requesting data from the memory of another memory sled 1240 (e.g., in another tier), or evicting data to the memory of another memory sled 1240 (e.g., in another tier) in response to memory access requests from compute sleds (e.g., compute sleds 1280, 1290) executing workloads. As shown in FIG. 13, the memory sled 1240 includes a central processing unit (CPU) 1402, a main memory 1404 (e.g., one or more physical memory resources 205-3), an input/output (I/O) subsystem 1406, communication circuitry 1412, and one or more data storage devices 1416. In some embodiments, one or more of the illustrative components may be incorporated in, or otherwise form a portion of, another component. For example, in some embodiments, the main memory 1404, or portions thereof, may be incorporated in the CPU 1402.

The CPU 1402 may be embodied as any type of processor capable of performing the functions described herein. As such, the CPU 1402 may be embodied as a single or multi-core processor(s), a microcontroller, or other processor or processing/controlling circuit. In some embodiments, the CPU 1402 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1402 includes the tier logic unit 1254 which may be embodied as any device or circuitry such as a field programmable gate array (FPGA) or specialized processor, capable of monitoring the performance of the memory devices (e.g., the main memory 1404), determining whether performance thresholds are being satisfied (e.g., within a predefined percentage of the performance threshold), learning patterns of phases of the workloads and the demands of each phase (e.g., volume of memory access requests) on the memory sled 1240, predicting the upcoming demands on the memory sled 1240 as a function of learned patterns of the phases, and generating performance notification data to be sent to the orchestrator server 1220, indicating the effects of the present and/or predicted demand on the performance of the memory sled 1240.

Similarly, the main memory 1404 may be embodied as any type of volatile (e.g., dynamic random access memory (DRAM), etc.) or non-volatile memory (e.g., non-volatile byte-addressable write-in-place memory, flash memory, etc.) or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance. In some embodiments, all or a portion of the main memory 1404 may be integrated into the CPU 1402. In operation, the main memory 1404 may store various software and data used during operation such as data frequently accessed by workloads (e.g., working data), target performance data, memory tier allocation data, performance comparison data, demand prediction data, operating systems, applications, programs, libraries, and drivers.

The I/O subsystem 1406 may be embodied as circuitry and/or components to facilitate input/output operations with the CPU 1402, the main memory 1404, and other components of the memory sled 1240. For example, the I/O subsystem 1406 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1406 may form a portion of a system-on-a-chip (SoC) and be incorporated, along with one or more of the CPU 1402, the main memory 1404, and other components of the memory sled 1240, on a single integrated circuit chip.

The illustrative communication circuitry 1408 includes a network interface controller (NIC) 1410, which may also be referred to as a host fabric interface (HFI). The NIC 1410 may be embodied as one or more add-in-boards, daughtercards, network interface cards, controller chips, chipsets, or other devices that may be used by the memory sled 1240 to connect with another compute device (e.g., the orchestrator server 1220, another memory sled 1240, etc.). In some embodiments, the NIC 1410 may be embodied as part of a system-on-a-chip (SoC) that includes one or more processors, or included on a multichip package that also contains one or more processors. In some embodiments, the NIC 1410 may include a local processor (not shown) and/or a local memory (not shown) that are both local to the NIC 1410. In such embodiments, the local processor of the NIC 1410 may be capable of performing one or more of the functions of the CPU 1402 described herein. Additionally or alternatively, in such embodiments, the local memory of the NIC 1410 may be integrated into one or more components of the memory sled 1240 at the board level, socket level, chip level, and/or other levels.

The one or more illustrative data storage devices 1412, may be embodied as any type of devices configured for short-term or long-term storage of data such as, for example, memory devices and circuits, memory cards, hard disk drives, solid-state drives, or other data storage devices. Each data storage device 1412 may include a system partition that stores data and firmware code for the data storage device 1412. Each data storage device 1412 may also include an operating system partition that stores data files and executables for an operating system.

As described above, the client device 1214, the orchestrator server 1220, and the managed nodes 1230 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 15:
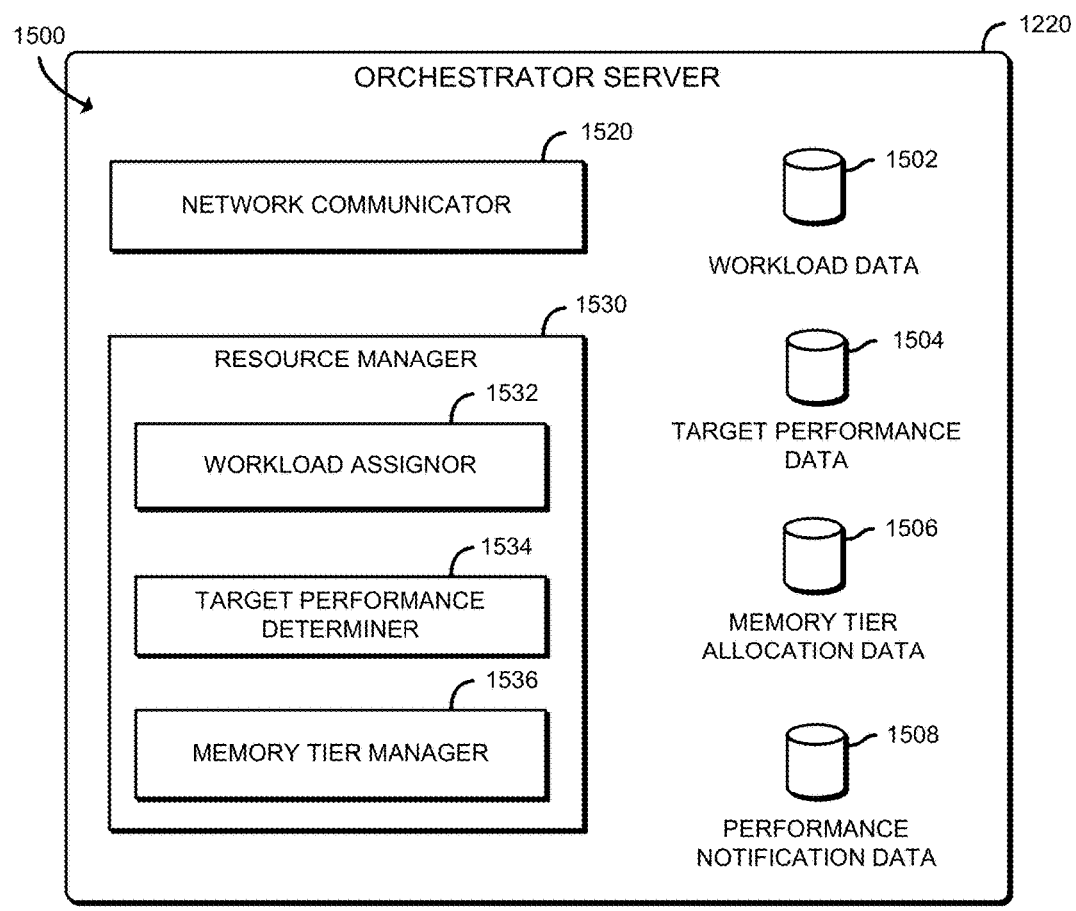
FIG. 15 is a simplified block diagram of at least one embodiment of an environment that may be established by the orchestrator server of FIGS. 12 and 13.

Referring now to FIG. 15, the orchestrator server 1220 may establish an environment 1500 during operation. The illustrative environment 1500 includes a network communicator 1520 and a resource manager 1530. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, resource manager circuitry 1530, etc.). It should be appreciated that, in such embodiments, one or more of the network communicator circuitry 1520 or resource manager circuitry 1530 may form a portion of one or more of the CPU 1302, the main memory 1304, the I/O subsystem 1306, and/or other components of the orchestrator server 1220. In the illustrative embodiment, the environment 1500 includes workload data 1502 which may be embodied as any data indicative of workloads to be executed by the managed nodes 1230 and the assignments of the workloads to the components of the managed nodes 1230, such as identifications of compute sleds 1280, 1290, to which workloads are assigned, and/or other data indicative of the present assignment of the workloads among the managed nodes 1230.

Additionally, the illustrative environment 1500 includes target performance data 1504, which may be embodied as any data indicative of target performance metrics (e.g., types of performance to be measured, such as memory access latency, CPI, MPKI, etc.) and performance thresholds to be met (e.g., actual values to be satisfied for each performance metric). A performance threshold may be satisfied when an actual measured performance during execution of the corresponding workload is within a predefined range (e.g., plus or minus 3%) of the performance threshold. As described herein, the target performance data 1504 may be included in a service level agreement with a customer. Further, in some embodiments, the target performance data 1504 may indicate how often (e.g. a frequency) the actual measured performance should be compared to the performance threshold to determine whether the performance threshold is being satisfied. The illustrative environment 1500 also includes memory tier allocation data 1506, which may be embodied as any data indicative of amounts and types of memory to be allocated to each tier. As described above, each memory sled 1240 may primarily include a particular type of memory. Accordingly, each tier, in the illustrative embodiment, is mapped to a different memory sled 1240. The memory tier allocation data 1506 may include an initial predefined mapping of amounts and types of memory to be allocated for each of multiple sets of target performance thresholds in a range, and may later be adjusted in response to performance notifications received from the memory sleds 1240. The illustrative environment 1500 additionally includes performance notification data 1508 which may be embodied as any data received from a memory sled 1240 indicative of whether the memory sled 1240 is satisfying (e.g., within a predefined range of) the corresponding performance thresholds for each workload under the memory tier allocation scheme presently in place, and if not, the amounts by which the present performance exceeds or falls short of the performance thresholds.

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1220, respectively. To do so, the network communicator 1520 is configured to receive and process data packets from one system or computing device (e.g., the client device 1214) and to prepare and send data packets to another computing device or system (e.g., the managed nodes 1230). Accordingly, in some embodiments, at least a portion of the functionality of the network communicator 1520 may be performed by the communication circuitry 1308, and, in the illustrative embodiment, by the NIC 1310.

The resource manager 1530, which may be embodied as hardware, firmware, software, virtualized hardware, emulated architecture, and/or a combination thereof, is configured to assign workloads to the managed nodes 1230, analyze the target performance data 1504 to identify performance thresholds to be satisfied for each workload, and determine and continually adjust the memory tier allocations to enable the memory resources (e.g., the memory 1404 of the memory sleds 1240) to be utilized efficiently (e.g., to satisfy the performance thresholds without over allocating memory resources) in the execution of the workloads. To do so, in the illustrative embodiment, the resource manager 1530 includes a workload assignor 1532, a target performance determiner 1534, and a memory tier manager 1536.

The workload assignor 1532, in the illustrative embodiment, is configured to assign workloads to the managed nodes 1230 for execution. The target performance determiner 1534, in the illustrative embodiment, is configured to parse a service level agreement, analyze metadata associated with a workload, or otherwise obtain the target performance data 1504 and determine the performance metrics and associated performance thresholds for each workload to be executed by the managed nodes 1230. Further, the memory tier manager 1536, in the illustrative embodiment, is configured to determine, as a function of the target performance data 1504 (e.g., the performance thresholds to be satisfied) and the amounts and types of available memory on the memory sleds 1240, an allocation of two or more of the memory sleds 1240 in tiers, in which a primary tier acts as a cache for a subsequent (e.g., secondary) tier. As such, the memory tier manager 1536 is configured to map the primary tier to a memory sled 1240 having faster, lower capacity memory, than a memory sled 1240 mapped to a subsequent tier. In some embodiments, the memory tier manager 1536 may determine a tiering scheme that includes more than two tiers of memory sleds 1240, with each subsequent tier having memory that is slower, but higher capacity, than the memory in the preceding tier. Further, in the illustrative embodiment, the memory tier manager 1536 is configured to adjust the allocation of the memory available in the memory sleds 1240 and the mapping of the tiers to the memory sleds 1240 in response to performance notifications from the memory sleds 1240 indicative of their ability or inability to satisfy the performance thresholds under the present allocation scheme.

It should be appreciated that each of the workload assignor 1532, the target performance determiner 1534, and the memory tier manager 1536 may be separately embodied as hardware, firmware, software, virtualized hardware, emulated architecture, and/or a combination thereof. For example, the workload assignor 1532 may be embodied as a hardware component, while the target performance determiner 1534 and the memory tier manager 1536 are embodied as virtualized hardware components or as some other combination of hardware, firmware, software, virtualized hardware, emulated architecture, and/or a combination thereof.

Figure 16:
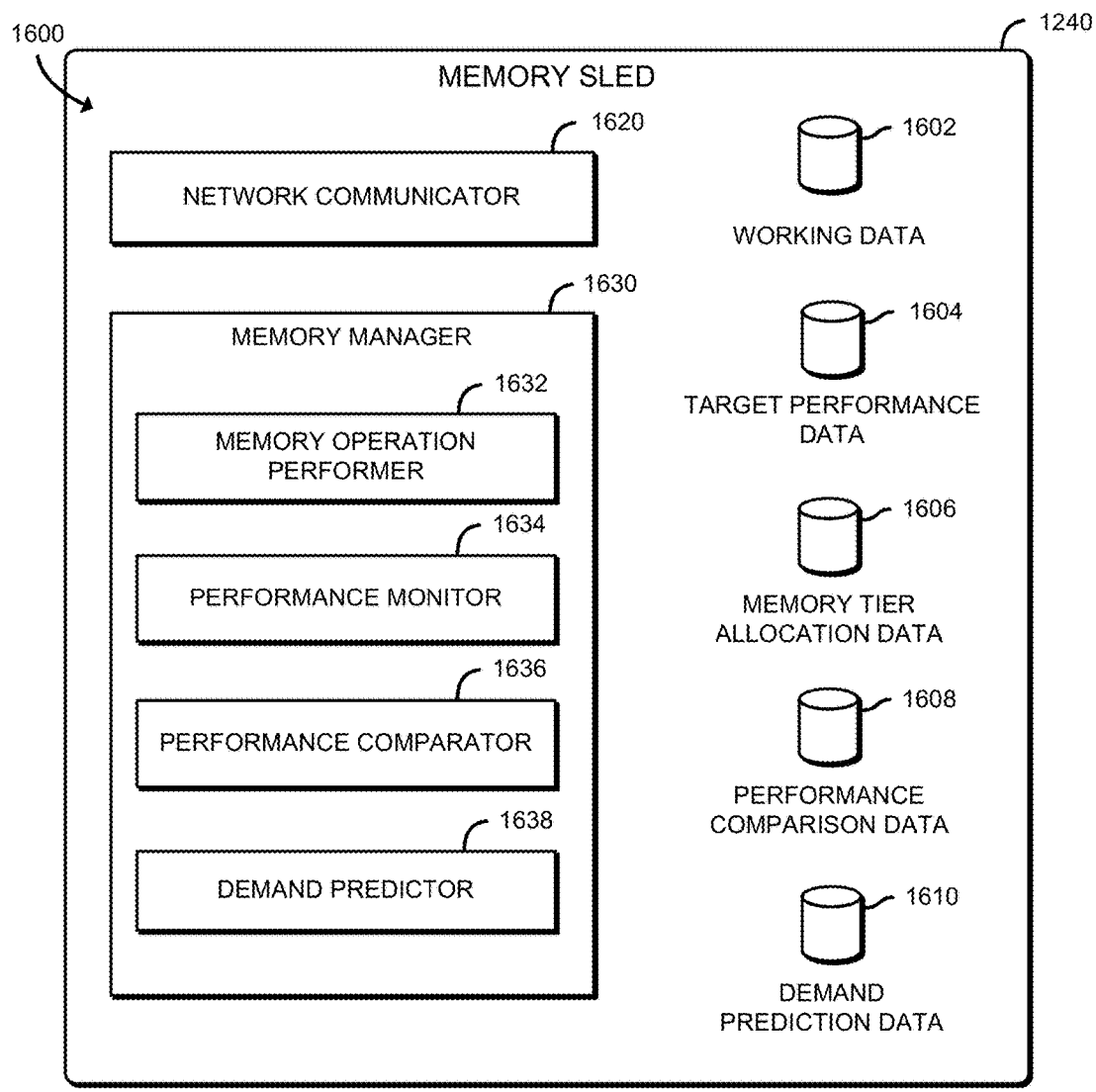
FIG. 16 is a simplified block diagram of at least one embodiment of an environment that may be established by a storage sled of FIGS. 12 and 14.

Referring now to FIG. 16, in the illustrative embodiment, each memory sled 1240 may establish an environment 1600 during operation. The illustrative environment 1600 includes a network communicator 1620 and a memory manager 1630. Each of the components of the environment 1600 may be embodied as hardware, firmware, software, or a combination thereof. As such, in some embodiments, one or more of the components of the environment 1600 may be embodied as circuitry or a collection of electrical devices (e.g., network communicator circuitry 1620, memory manager circuitry 1630, etc.). It should be appreciated that, in such embodiments, one or more of the network communicator circuitry 1520 or the memory manager circuitry 1630 may form a portion of one or more of the tier logic unit 1254, the communication circuitry 1408, the CPU 1402, the main memory 1404, the I/O subsystem 1406, and/or other components of the memory sled 1240.

In the illustrative embodiment, the environment 1600 includes working data 1602 which may be embodied as any data utilized by the workloads as they are executed. The working data 1602 may be stored in the main memory 1404 of the memory sled 1240 and accessed in response to memory access requests from compute sleds (e.g., the compute sleds 1280, 1290) executing the workloads. Additionally, the illustrative environment 1600 includes target performance data 1604 which may be embodied as any data indicative of performance metrics and corresponding performance thresholds for workloads for which the present memory sled 1240 is allocated as a tier. In the illustrative embodiment, the target performance data 1604 is sent to the memory sled 1240 by the orchestrator server 1220. The illustrative environment 1600 also includes memory tier allocation data 1606, which is similar to the memory tier allocation data 1506 described with reference to FIG. 15, except the memory tier allocation data 1506, in the illustrative embodiment includes only information pertinent to the tiering scheme that the present memory sled 1240 is part of. As such, the memory tier allocation data 1506 includes identifiers of the other memory sleds 1240 in the same tiering scheme as the present memory sled 1240, the tier to which each memory sled 1240 is assigned, and the amounts of memory to be allocated by each memory sled 1240 in each tier for each workload.

Additionally, the illustrative embodiment 1600 includes performance comparison data 1608 which may be any data indicative of a comparison between measured performance metrics of the memory sled 1240 and the performance thresholds (e.g., from the target performance data 1604) for each workload. As described in more detail herein, the performance comparison data 1608 may indicate a comparison between a predicted performance of the memory sled 1240 in response to an upcoming change in the demand on the memory sled and the performance thresholds, such as if a corresponding workload is about to (e.g., within a predefined time period) transition to a different phase that will affect the demand on the memory sled 1240. Additionally, the illustrative environment 1600 includes demand prediction data 1610 which may be embodied as any data indicative of a predicted demand (e.g., volume or type of memory access requests, such as primarily read requests, primarily write requests, a size of data sets to be read or written, etc.)

or a change in the demand of one or more workloads on the memory sled 1240, which may be determined based on patterns in workload phases, as described in more detail herein.

In the illustrative environment 1600, the network communicator 1620, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the memory sled 1240, respectively. To do so, the network communicator 1620 is configured to receive and process data packets from one system or computing device (e.g., the orchestrator server 1220, a compute sled 1280, 1290, another memory sled 1240, etc.) and to prepare and send data packets to a system or computing device (e.g., the orchestrator server 1220, a compute sled 1280, 1290, another memory sled 1240, etc.). Accordingly, in some embodiments, at least a portion of the functionality of the network communicator 1620 may be performed by the communication circuitry 1408, and, in the illustrative embodiment, by the NIC 1410.

The memory manager 1630, which may be embodied as hardware, firmware, software, virtualized hardware, emulated architecture, and/or a combination thereof as discussed above, is configured to perform memory operations (e.g., reads, writes, cache evictions, requests for data from a memory sled 1240 in a subsequent tier in response to a cache miss, etc.) in response to memory access requests from the compute sleds 1280, 1290, monitor the performance of the memory sled 1240 as the memory operations are being performed, compare the measured performance to the performance thresholds, and predict a future demand on the memory sled 1240 as a result of upcoming changes in the phases of one or more workloads. To do so, in the illustrative embodiment, the memory manager 1630 includes a memory operation performer 1632, a performance monitor 1634, a performance comparator 1636, and a demand predictor 1638.

The memory operation performer 1632, in the illustrative embodiment, is configured to perform memory operations (e.g., reads, writes, cache evictions, requests for data from a memory sled 1240 in a subsequent tier) as the workloads are executed (e.g., in response to memory access requests from the compute sleds 1280, 1290 executing the workloads). The performance monitor 1634, in the illustrative embodiment, is configured to measure one or more performance metrics (e.g., latency, MPKI, CPI) as the memory access operations are being performed. The performance comparator 1636, in the illustrative embodiment, is configured to compare the measured performance to the performance thresholds (e.g., in the target performance data 1604) and determine whether and by how much the measured performance varies from the performance thresholds. In doing so, the performance comparator 1636 may determine whether a difference between the measured performance and the corresponding threshold is within a predefined range, meaning the performance threshold is satisfied, or outside the range, meaning the performance threshold is not satisfied. The demand predictor 1638, in the illustrative embodiment, is configured to detect phases of the workloads based on timestamps of when the memory requests were received and the types of requests (e.g., read requests, write requests, data set sizes, categories of data read or written, such as text, binary, etc.), associate the effects on performance of the memory sled 1240 with the phases (e.g., a certain percentage increase in MPKI, etc.), identify patterns in the phases over time, predict what the next phase will be for a workload and when it will occur, based on the patterns and the amount of time the workload has been in the present phase, and predict the change in demand on the memory sled 1240 by referencing the previous demand on the memory sled 1240 during that phase.

Figure 17:
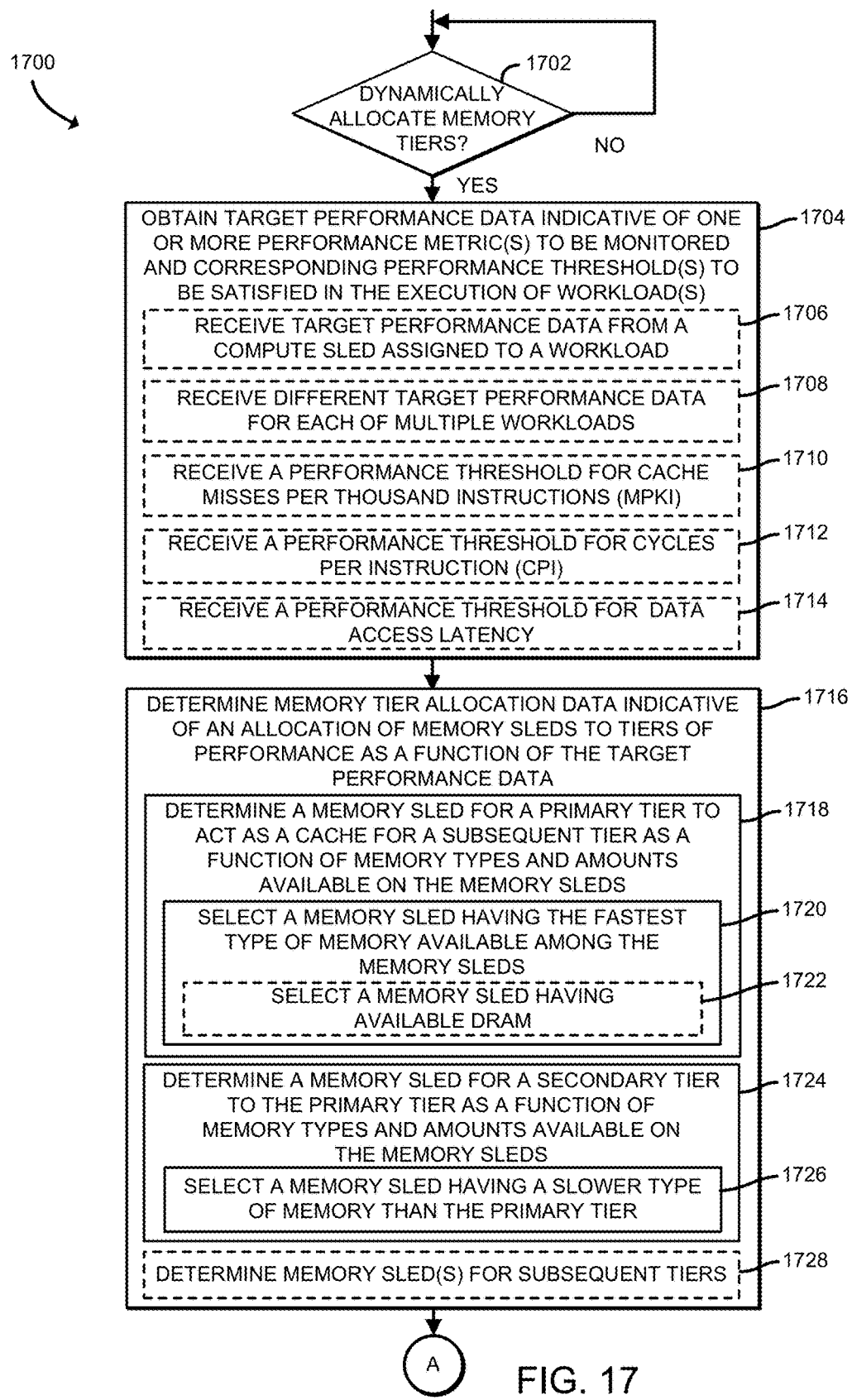
FIGS. 17-19 are a simplified flow diagram of at least one embodiment of a method for performing dynamic allocation of memory tiers that may be performed by the orchestrator server of FIGS. 12 and 13.

Referring now to FIG. 17, in use, the orchestrator server 1220 may execute a method 1700 for dynamically allocating memory tiers. The method 1700 begins with block 1702 in which the orchestrator server 1220 determines whether to enable dynamic allocation of memory tiers. In the illustrative embodiment, the orchestrator server 1220 determines to enable dynamic allocation of memory tiers in response determining that a configuration file (e.g., stored in a data storage device 1312) includes a setting indicating that dynamic allocation of memory tiers should be enabled, in response to determining that the memory sleds 1240 are capable of facilitating dynamic allocation of memory tiers (e.g., the memory sleds 1240 are equipped with the tier logic unit 1254), in response to a request from an administrator compute device (not shown), and/or based on other factors. Regardless, in response to a determination to enable dynamic allocation of memory tiers, the method 1700 advances to block 1704 in which the orchestrator server 1220 obtains target performance data (e.g., the target performance data 1504). As described above, the target performance data 1504, in the illustrative embodiment, is indicative of one or more performance metrics to be monitored and corresponding performance thresholds to be satisfied in the execution of workloads. In obtaining the target performance data 1504, the orchestrator server 1220 may receive the target performance data 1504 from a compute sled 1280, 1290 that the orchestrator server 1220 has assigned one or more workloads to, as indicated in block 1706. For example, the workload may have metadata associated with it that indicates the service level agreement ("SLA") with the customer for whom the workload is to be executed, and the compute sled 1280, 1290 may parse the metadata and send the corresponding target performance data 1504 to the orchestrator server 1220.

As indicated in block 1708, the orchestrator server 1220 may receive different target performance data 1504 for each of multiple workloads to be executed. In receiving the target performance data 1504, the orchestrator server 1220 may receive a performance threshold for cache misses per thousand instructions (MPKI) executed for a workload, as indicated in block 1710. As will be appreciated by those skilled in the art of memory management, a cache miss occurs when requested data is not present in a cache memory device and must instead be retrieved from another, usually slower, memory device. As such, cache misses may slow down the execution of a workload. Additionally or alternatively, the orchestrator server 1220 may receive a performance threshold for cycles per instruction (CPI), as indicated in block 1712. The CPI of a workload may be largely affected by the availability of data needed to perform an operation. As such, when data must be retrieved from a slower memory device rather than a faster memory device, additional cycles elapse as the memory access operation is performed. Additionally or alternatively, the orchestrator server 1220 may receive a performance threshold for data access latency, as indicated in block 1714. Data access latency is similar to CPI in that it is a measurement of time that elapses to perform an operation, but differs in that the data access latency may be expressed in units of time (e.g., nanoseconds or milliseconds) rather than clock cycles of a device.

Afterwards, the method 1700 advances to block 1716 in which the orchestrator server 1220 determines memory tier allocation data (e.g., the memory tier allocation data 1506). As described above, the memory tier allocation data 1506, in the illustrative embodiment, is indicative an allocation of the memory sleds 1240 to tiers of performance (e.g., memory speed). The orchestrator server 1220, in the illustrative embodiment, determines the memory tier allocation data 1506 as a function of the target performance data 1504 from block 1704. In determining the memory tier allocation data 1506, the orchestrator server 1220 may determine a memory sled 1240 for a primary tier (e.g., Tier 1 in FIG. 12) to act as a cache for a subsequent tier, as a function of the memory types and amounts of memory available on the memory sleds 1240, as indicated in block 1718. In doing so, in the illustrative embodiment and as indicated in block 1720, the orchestrator server 1220 selects a memory sled 1240 having the fastest type of memory available among the memory sleds 1240 (e.g., the memory sled 1250 in FIG. 12). As such, and as indicated in block 1722, the orchestrator server 1220 may select a memory sled (e.g., the memory sled 1250) having available (e.g., a predefined amount of presently unallocated) DRAM (e.g., the memory device type A 1252 in FIG. 12). The orchestrator server 1220 may determine the initial amount of memory to be allocated by referencing a mapping (e.g., in the memory tier allocation data 1506) of sets of target performance thresholds and corresponding amounts and types of memory to be allocated.

Additionally, the orchestrator server 1220 determines a memory sled 1240 for a secondary tier (e.g., Tier 2 in FIG. 12) as a function of the memory types and amounts available among the memory sleds 1240, as indicated in block 1724. In doing so, the orchestrator server 1220, in the illustrative embodiment, selects a memory sled 1240 having a slower type of memory (e.g., the memory device type B 1262 in FIG. 12) than the primary tier, as indicated in block 1726. Further, and as indicated in block 1728, the orchestrator server 1220 may determine memory sleds 1240 for subsequent tiers, following the same scheme as described above (e.g., slower, higher capacity memory for each subsequent tier). Afterwards, the method 1700 advances to block 1730 of FIG. 18, in which the orchestrator server 1220 sends the memory tier allocation data 1506 to the determined memory sleds 1240 to establish the tiers of performance.

Figure 18:
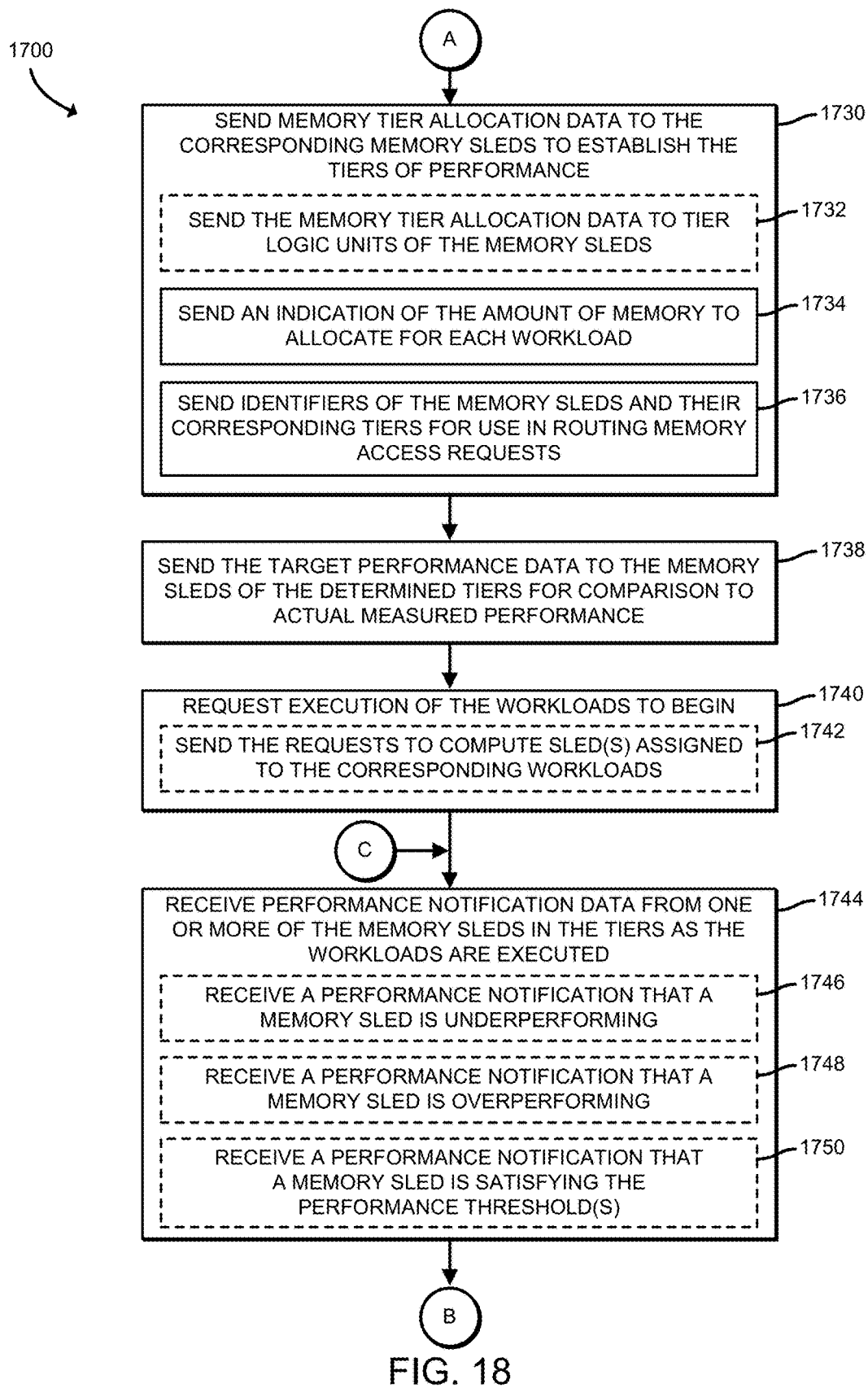

Referring now to FIG. 18, in sending the memory tier allocation data 1506, the orchestrator server 1220, in the illustrative embodiment, sends the memory tier allocation data to the tier logic units 1254 of the memory sleds 1240 (e.g., via the communication circuitry 1408 of each corresponding memory sled 1240), as indicated in block 1732. As indicated in block 1734, the orchestrator server 1220 sends an indication of the amount of memory to allocate for each workload. Additionally, and as indicated in block 1736, the orchestrator server 1220 may send identifiers of the memory sleds 1240 and their corresponding tiers (e.g., memory sled 1250 associated with Tier 1, memory sled 1260 associated with Tier 2) to the determined memory sleds 1240 for use in routing memory access requests. For example, the orchestrator server 1220 may send, to the memory sled 1250 in the primary tier, an identifier (e.g., an IP address or other unique identifier) of the memory sled 1260 (e.g., the secondary tier) to provide the memory sled 1250 with information indicative of which memory sled 1240 to evict data to and/or where to request data from, when the requested data is not present in the memory sled 1250.

Subsequently, the method 1700 advances to block 1738 in which the orchestrator server 1220 sends the target performance data 1504 to the memory sleds 1240 of the determined tiers (e.g., the memory sleds 1250, 1260) for comparison to actual measured performance once the memory sleds 1250, 1260 begin performing memory access operations for the compute sleds 1280, 1290 executing the workloads. Afterwards, the orchestrator server 1220 requests execution of the workloads to begin, as indicated in block 1740. In doing so, the orchestrator server 1220 sends the requests to the compute sleds 1280, 1290 assigned to the workloads, as indicated in block 1742. Subsequently, in block 1744, the orchestrator server 1220 receives performance notification data (e.g., the performance notification data 1508) from the memory sleds 1240 in the tiers as the workloads are executed. In doing so, the orchestrator server 1220 may receive a performance notification that a memory sled 1240 is underperforming (e.g., falling short of the corresponding thresholds by not accessing data fast enough), as indicated in block 1746. Additionally or alternatively, the orchestrator server 1220 may receive a performance notification that a memory sled 1240 is overperforming (e.g., exceeding the corresponding thresholds by accessing data faster than required), as indicated in block 1748. The orchestrator server 1220 may additionally or alternatively receive a performance notification that a memory sled 1240 is satisfying (e.g., within a predefined range) the performance thresholds, as indicated in block 1750. Afterwards, the method 1700 advances to block 1752 of FIG. 19, in which the orchestrator server 1220 may receive a resource remap request from a compute sled 1280, 1290 executing a workload. For example, the compute sled 1280 may determine that a particular error, such as a data fragmentation error, has occurred on one of the memory sleds 1240 in the set of tiers and send a resource remap request to the orchestrator server 1220 to map one of the tiers to a different memory sled 1240.

Figure 19:
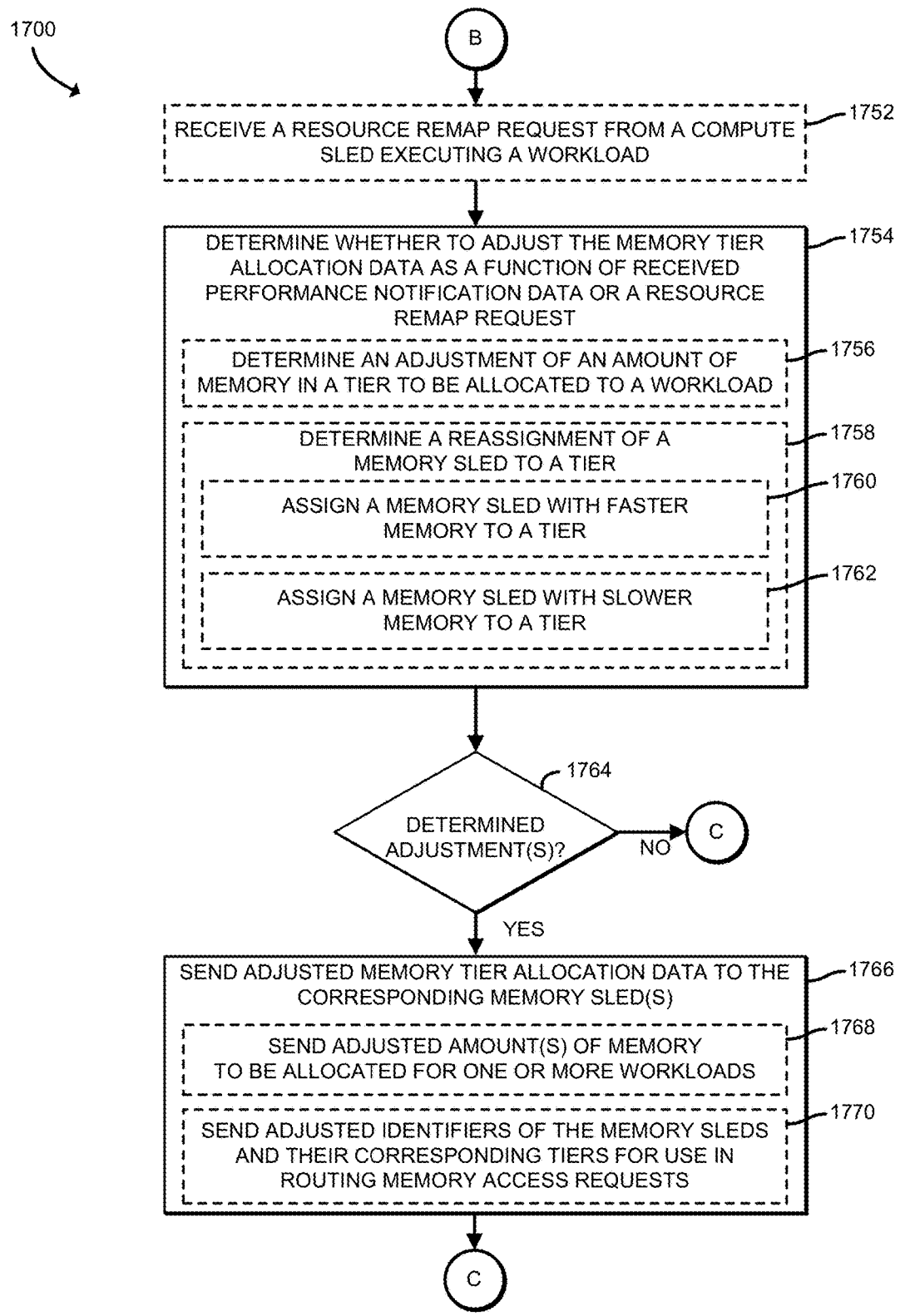

Referring now to FIG. 19, in block 1754, the orchestrator server 1220 determines whether to adjust the memory tier allocation data 1506 as a function of received performance notification data 1508 and/or a memory resource remap request (e.g., from block 1752). In doing so, and as indicated in block 1756, the orchestrator server 1220 may determine an adjustment of an amount of memory in a tier to be allocated to a workload (e.g., an increase in the amount of DRAM allocated on Tier 1 to decrease the MPKI, or a decrease in the amount of DRAM allocated on Tier 1 to increase the MPKI to be closer to the corresponding performance threshold). Additionally or alternatively, the orchestrator server 1220 may determine a reassignment of a memory sled 1240 to a tier, as indicated in block 1758. In doing so, the orchestrator server 1220 may assign a memory sled 1240 with a faster memory to a particular tier, as indicated in block 1760 (e.g., to improve latency or CPI). Additionally or alternatively, the orchestrator server 1220 may determine to assign a memory sled 1240 with a slower memory to a tier (e.g., determine to remove the memory sled 1260 from Tier 2 and assign memory sled 1270 to Tier 2 instead), as indicated in block 1762.

In block 1764, the orchestrator server 1220 determines the subsequent actions to perform as a function of whether adjustments to the memory tier allocation data 1506 were determined in block 1754. If not, the method 1700 loops back to block 1744 in which the orchestrator server 1220 awaits performance notification data 1508 from the memory sleds 1240. Otherwise, the method 1700 advances to block 1766 in which the orchestrator server 1220 sends the adjusted memory tier allocation data to the corresponding memory sleds 1240 (e.g., the memory sleds 1240 affect by the adjustment). In doing so, the orchestrator server 1220 may send one or more indications of adjusted amounts of memory to be allocated for one or more of the workloads, as indicated in block 1768. Additionally or alternatively, the orchestrator server 1220 may send adjusted identifiers of the memory sleds 1240 and their corresponding tiers for use in routing memory access requests (e.g., an update that indicates that memory sled 1260 has been replaced with memory sled 1270 for Tier 2), as indicated in block 1770. Subsequently, the method 1700 loops back to block 1744 in which the orchestrator server 1220 awaits additional performance notification data 1508 from the memory sleds 1240.

Figure 20:
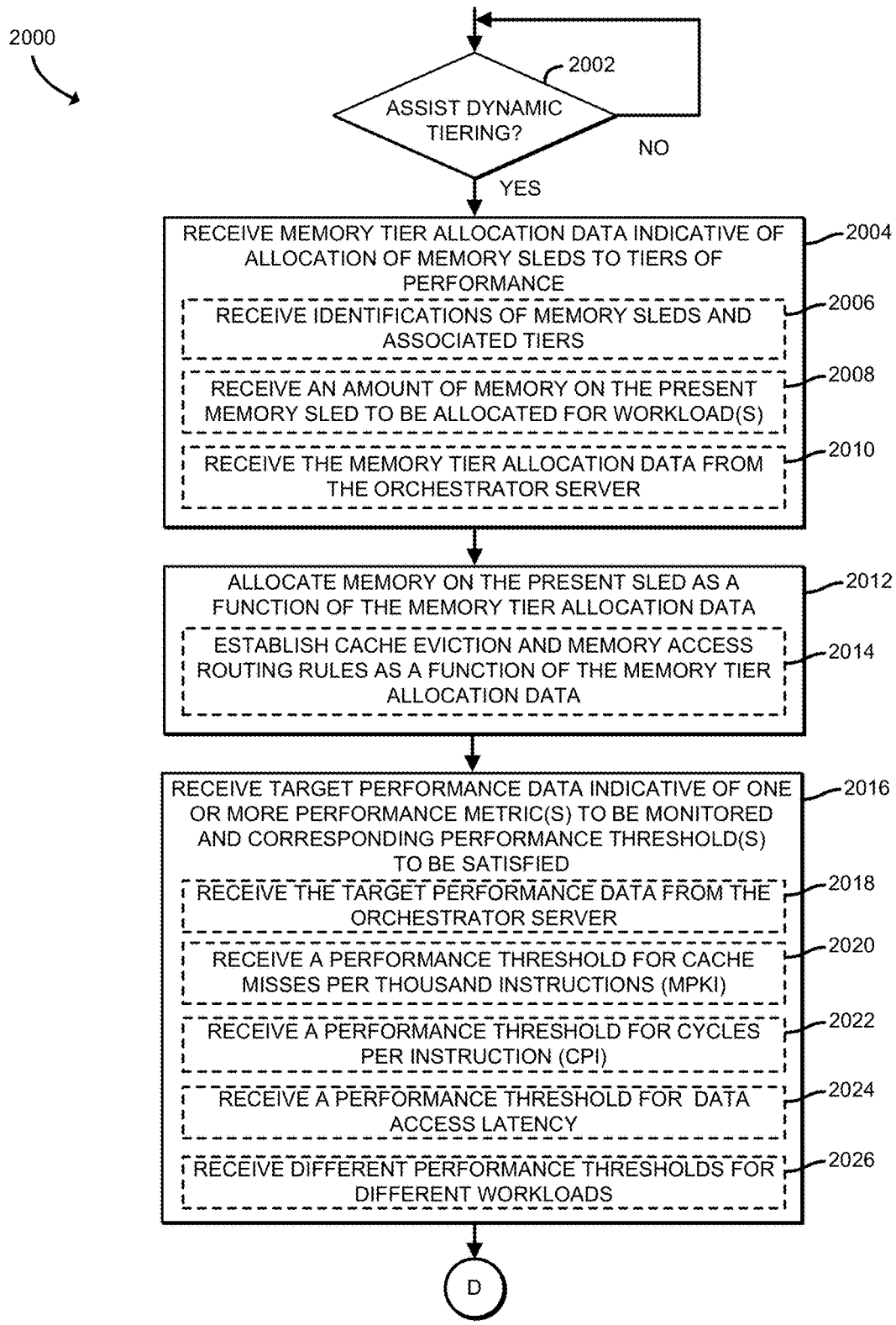
FIGS. 20-23 are a simplified flow diagram of at least one embodiment of a method for facilitating the dynamic allocation of memory tiers that may be performed by a storage sled of FIGS. 12 and 14.

Referring now to FIG. 20, in use, a memory sled 1240 may execute a method 2000 for assisting dynamic memory tier allocation. The method 2000 begins with block 2002, in which the memory sled 1240 determines whether to assist in dynamic memory tier allocation. The memory sled 1240 may determine to assist dynamic tier allocation if the memory sled 1240 is powered on and communicatively connected to the orchestrator server 1220, in response to a determination that the memory sled 1220 is equipped with the tier logic unit 1254, and/or based on other criteria. Regardless, in response to a determination to assist in dynamic tier allocation, the method 2000 advances to block 2004, in which the memory sled 1240 receives the memory tier allocation data 1606 indicative of the allocation of memory sleds 1240 to tiers of performance (e.g., speed). In doing so, the memory sled 1240, in the illustrative embodiment, receives identifications of memory sleds 1240 and associated tiers (e.g., memory sled 1250 to Tier 1, memory sled 1260 to Tier 2, etc.), as indicated in block 2006. Additionally, in the illustrative embodiment, the memory sled 1240 receives an indication of the amount of memory on the present memory sled 1240 to be allocated for each of one or more workloads, as indicated in block 2008. The memory sled 1240, in the illustrative embodiment, receives the memory tier allocation data 1606 from the orchestrator server 1220, as indicated in block 2010.

Subsequently, in block 2012, the memory sled 1240 allocates memory on the present sled 1240 as a function of the memory tier allocation data 1606. In doing so, in the illustrative embodiment, the memory sled 1240 establishes cache eviction and memory access routing rules as a function of the memory tier allocation data 1606, as indicated in block 2014. For example, for a given workload, the memory sled 1240 may determine that any data that will not fit within the allocated memory on the present sled 1240 must be evicted to a memory sled 1240 assigned to a subsequent tier. Likewise, any requested data that is not available in the allocated memory of the present sled 1240 should be requested from a memory sled 1240 associated with the subsequent tier. In block 2016, the memory sled 1220 receives the target performance data 1604 indicative of one or more performance metrics to be monitored and corresponding performance thresholds to be satisfied. In doing so, the memory sled 1220, in the illustrative embodiment, receives the target performance data 1604 from the orchestrator server 1220, as indicated in block 2018. As indicated in block 2020, the memory sled 1240 may receive a performance threshold for MPKI. Additionally or alternatively, as indicated in block 2022, the memory sled 1240 may receive a performance threshold for CPI. As indicated in block 2024, the memory sled 1240 may receive a performance threshold for data access latency. In receiving the target performance data 1604, the memory sled 1240 may receive different performance thresholds for different workloads, as indicated in block 2026. Subsequently, the method 2000 advances to block 2028 of FIG. 21, in which the memory sled 1240 performs memory access operations in response to requests from the compute sleds 1280, 1290 as the workloads are executed, and as a function of the memory tier allocation data 1606 (e.g., pursuant to the memory allocations established above).

Figure 21:
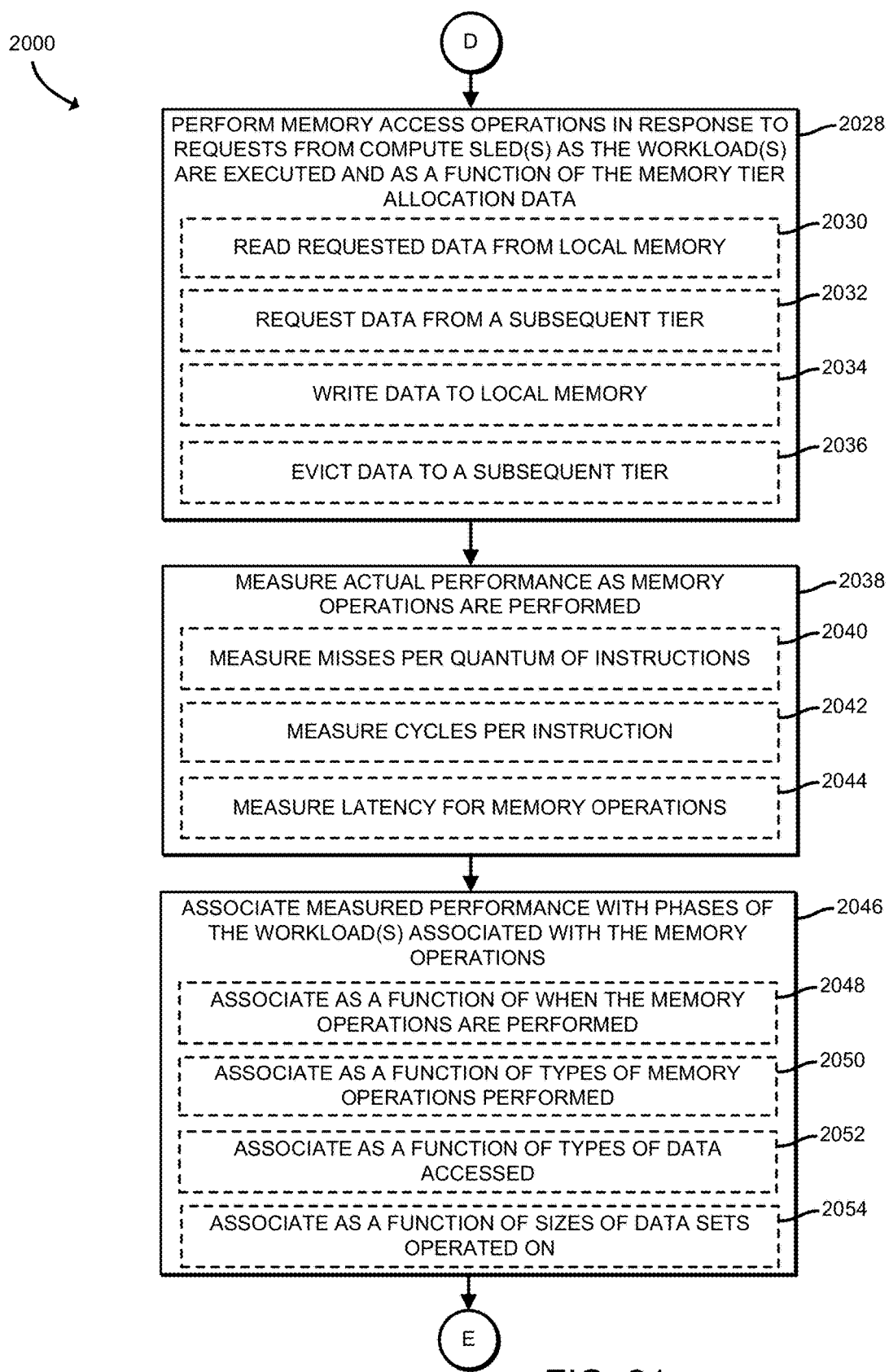

Referring now to FIG. 21, in performing the memory access operations, the memory sled 1240 may read requested data from local memory (e.g., the memory 1404), as indicated in block 2030. Additionally or alternatively, the memory sled 1240 may request data from a subsequent tier (e.g., if the requested data is not available in the memory 1404 of the present memory sled 1240), as indicated in block 2032. Additionally or alternatively, the memory sled 1240 may write data to the local memory 1404, as indicated in block 2034 and/or may evict data to a subsequent tier, as indicated in block 2036. As indicated in block 2038, the memory sled 1240 measures actual performance as the memory operations are performed. In doing so, in the illustrative embodiment, the memory sled 1240 may measure misses per quantum of instructions (e.g., misses per thousand instructions) as indicated in block 2040, measure CPI as indicated in block 2042, and/or measure latency of memory access operations, as indicated in block 2044. Further, in block 2046, the memory sled 1240 associates the measured performance with phases of the workloads associated with the memory access operations (e.g., the workloads responsible for which the memory access operations were performed). In doing so, the memory sled 1240 may associate the measured performance with the phases as a function of when the memory operations were performed (e.g., performance measurements associated with a set of memory access operations performed within a certain time period may be associated with a particular phase), as indicated in block 2048. Additionally or alternatively, the memory sled 1240 may perform the association as a function of types of memory operations performed (e.g., sets of write operations associated with a particular phase, set of read operations associated with a different phase), as indicated in block 2050. The memory sled 1240 may perform the association as a function of types of data accessed (e.g., written or read), as indicated in block 2052. For example, the memory sled 1240 may associate a phase with a set of data access operations to read and/or write text data, another phase with a set of access operations to read and/or write image data, and so on. Additionally or alternatively, the memory sled 1240 may perform the association as a function of the sizes of data sets operated on (e.g., read or written), as indicated in block 2054. For example, the memory sled 1240 may associate one phase with a set of data access operations for data sets within one range of sizes, and another phase with data sets within a different range of sizes. Subsequently, the method 2000 advances to block 2056 of FIG. 22, in which the memory sled 1240 predicts future demand from the workload(s) as a function of the workload phases identified in block 2046.

Figure 22:
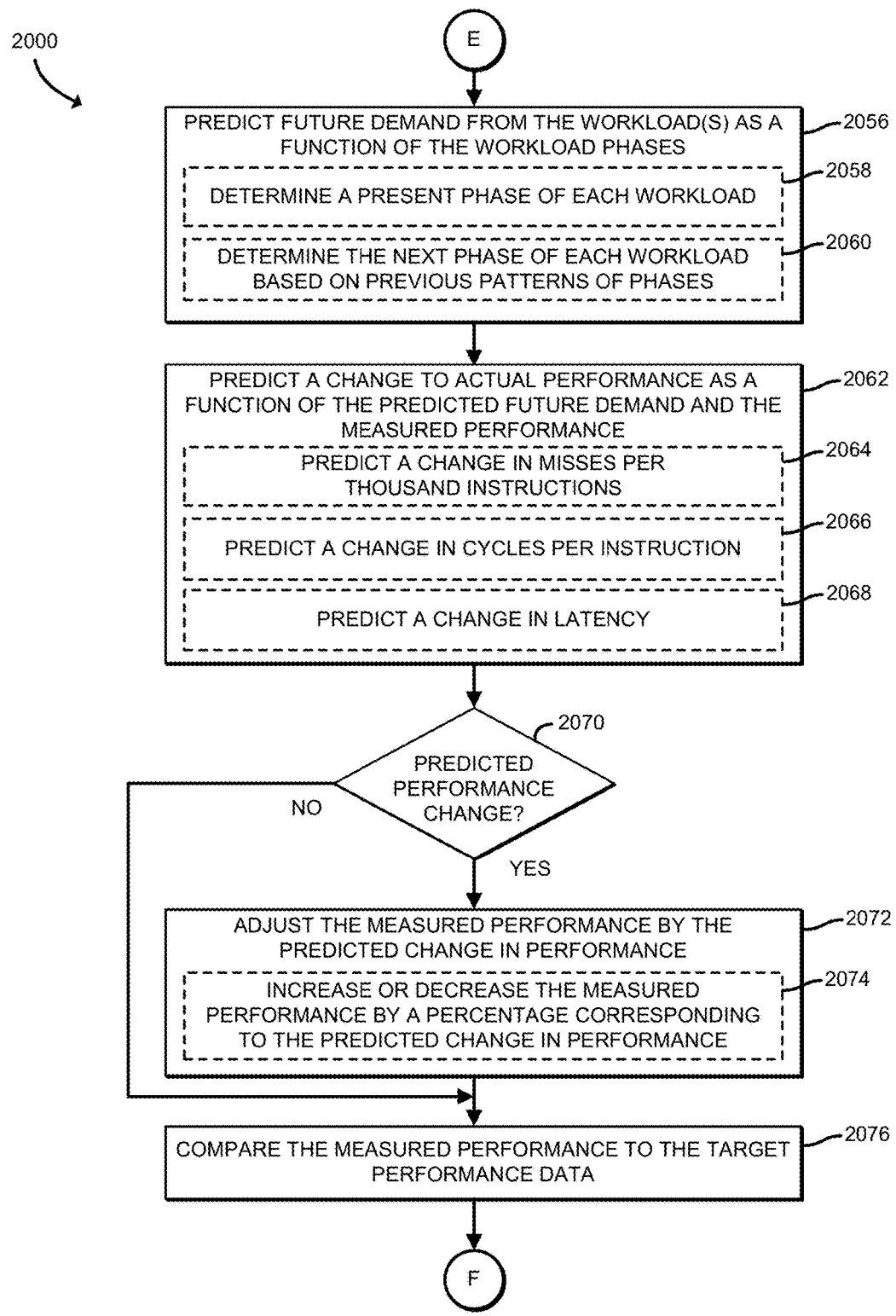

Referring now to FIG. 22, in predicting the future demand, the memory sled 1240 may determine a present phase of each workload (e.g., by comparing attributes of present memory operations to the attributes associated with each of the phases, such as data set sizes, data types, etc.), as indicated in block 2058. Additionally, the memory sled 1240 may determine the next phase of each workload based on previous patterns of phases for each workload (e.g., phase A is typically followed by phase B, etc.), as indicated in block 2060. Subsequently, the method 2000 advances to block 2062 in which the memory sled 1240 predicts a change to the actual performance of the memory sled 1240 as a function of the predicted future demand and the presently measured performance In doing so, the memory sled 2064 may predict a change in MPKI that will occur in the next phase, as indicated in block 2064, a change in CPI, as indicated in block 2066, and/or a change in latency, as indicated in block 2068. In block 2070, the memory sled determines the subsequent actions to perform based on whether a performance change is predicted for the next phase (e.g., if the next phase will bring a change in performance and if the next phase is predicted to occur within a predefined amount of time). If so, the method 2000 advances to block 2072, in which the memory sled 1240 adjusts the measured performance by the predicted change in performance In doing so, the memory sled 1240 may increase or decrease the measured performance by a percentage corresponding to the predicted change in performance, as indicated in block 2074. Subsequently, or if a change in performance is not predicted, the method 2000 advances to block 2076, in which the memory sled 1240 compares the measured performance, which may have been adjusted in block 2072, to the target performance data 1604. Subsequently, the method 2000 advances to block 2078 of FIG. 23, in which the memory sled 1240 determines the subsequent actions to perform.

Figure 23:
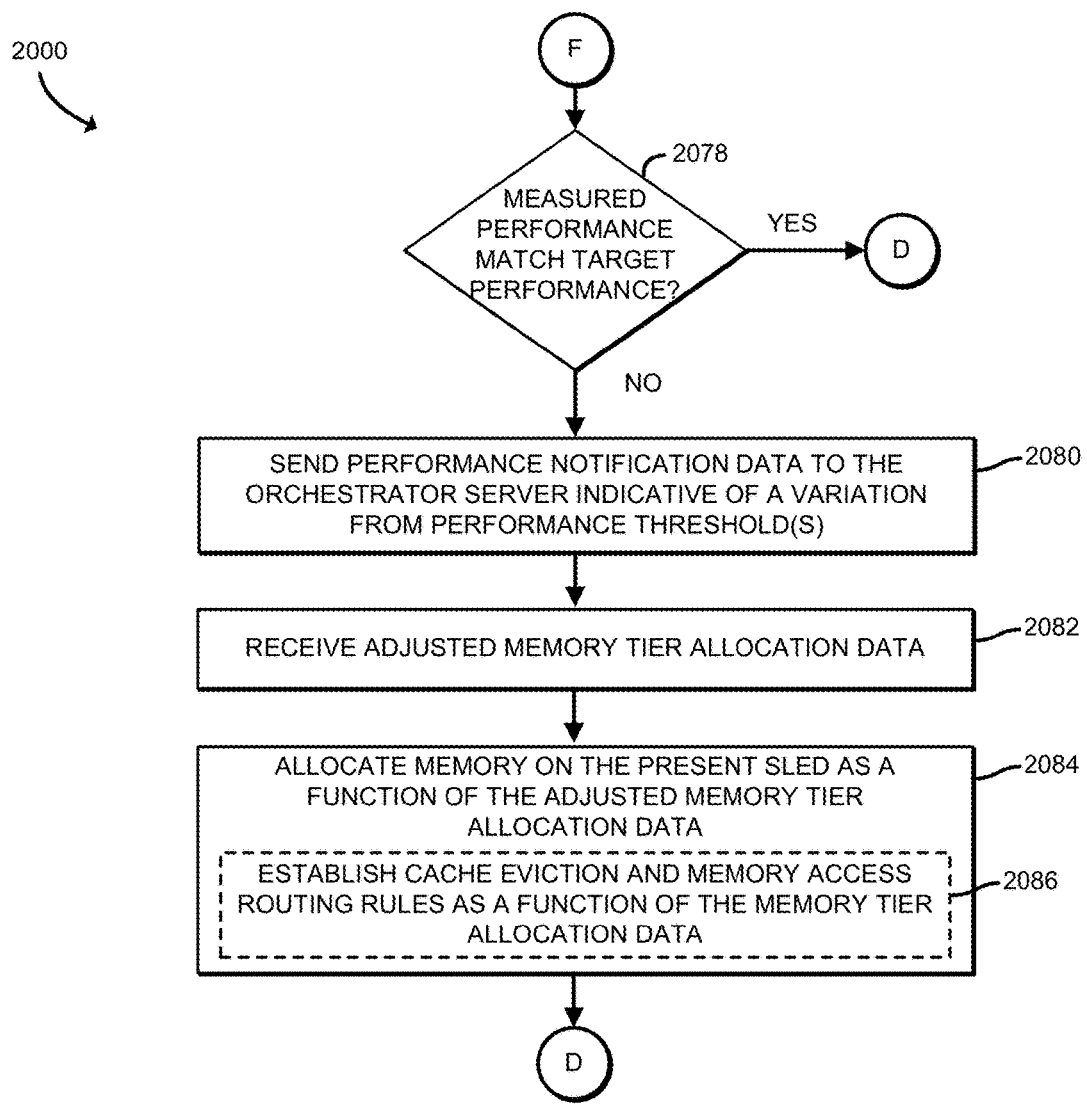

Referring now to FIG. 23, if the measured performance matches the target performance (e.g., is within a predefined range such as 3% of the thresholds), the method 2000 loops back to block 2028 of FIG. 21, in which the memory sled 1240 continues to perform memory access operations. Otherwise, the method 2000 advances to block 2080 in which the memory sled 1240 sends performance notification data 1508 to the orchestrator server 1220 indicating a variation from the performance threshold(s). As such, and as discussed above with reference to the method 1700, the orchestrator server 1220 will then adjust the memory allocation tier data to allocate more or less memory in a tier or change the memory type (e.g., by reassigning a tier to a different memory sled 1240) to more closely match the performance thresholds. In block 2082, the memory sled 1240 receives the adjusted memory tier allocation data 1606 from the orchestrator server 1220. Subsequently, in block 2084, the memory sled 1240 allocates memory on the present sled as a function of the adjusted memory tier allocation data 1606, such as by increasing or decreasing the amount of memory for one or more workloads. As indicated in block 2086, the memory sled 1240 may establish revised cache eviction and memory access routing rules as a function of the adjusted memory tier allocation data 1606 (e.g., change an eviction rule to evict data to the memory sled 1260 rather than the memory sled 1250, etc.). Subsequently, the method 2000 loops back to block 2028 of FIG. 21, in which the memory sled 1240 continues to perform memory access operations for the workloads.

Figure 24:
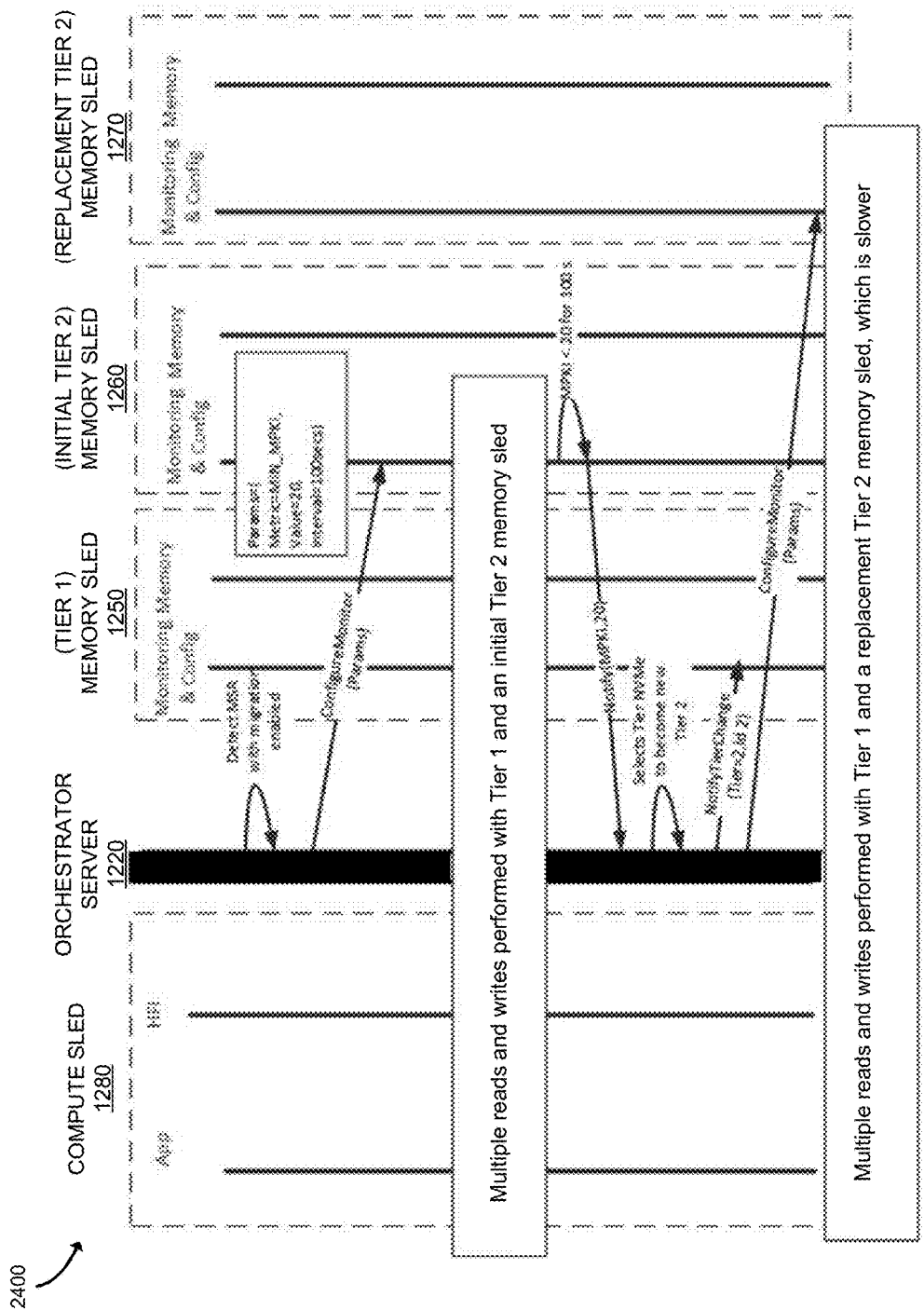
FIG. 24 is a simplified flow diagram of at least one embodiment of network communications to dynamically adjust an allocation of memory sleds to a memory tier.

Referring now to FIG. 24, in a flow 2400 of network communications, the orchestrator server 1220 sends target performance data to the memory sled 1250, which is to operate as Tier 2. Subsequently, the memory sled 1250 sends back a performance notification indicating that the memory sled 1250 is overperforming (e.g., the MPKI has been less than the target MPKI for 100 seconds). In response, the orchestrator server 1220 adjusts the memory tier allocation data 1506 to assign memory sled 1270 to Tier 2. Afterwards, the orchestrator server 1220 sends the adjusted memory tier allocation data 1506 to the memory sled 1250 in Tier 1, indicating that the memory sled 1270 is now assigned to Tier 2, and sends the memory tier allocation data 1506 to the memory sled 1270 to provide the memory sled 1270 with information about the performance thresholds to be satisfied.

Figure 25:
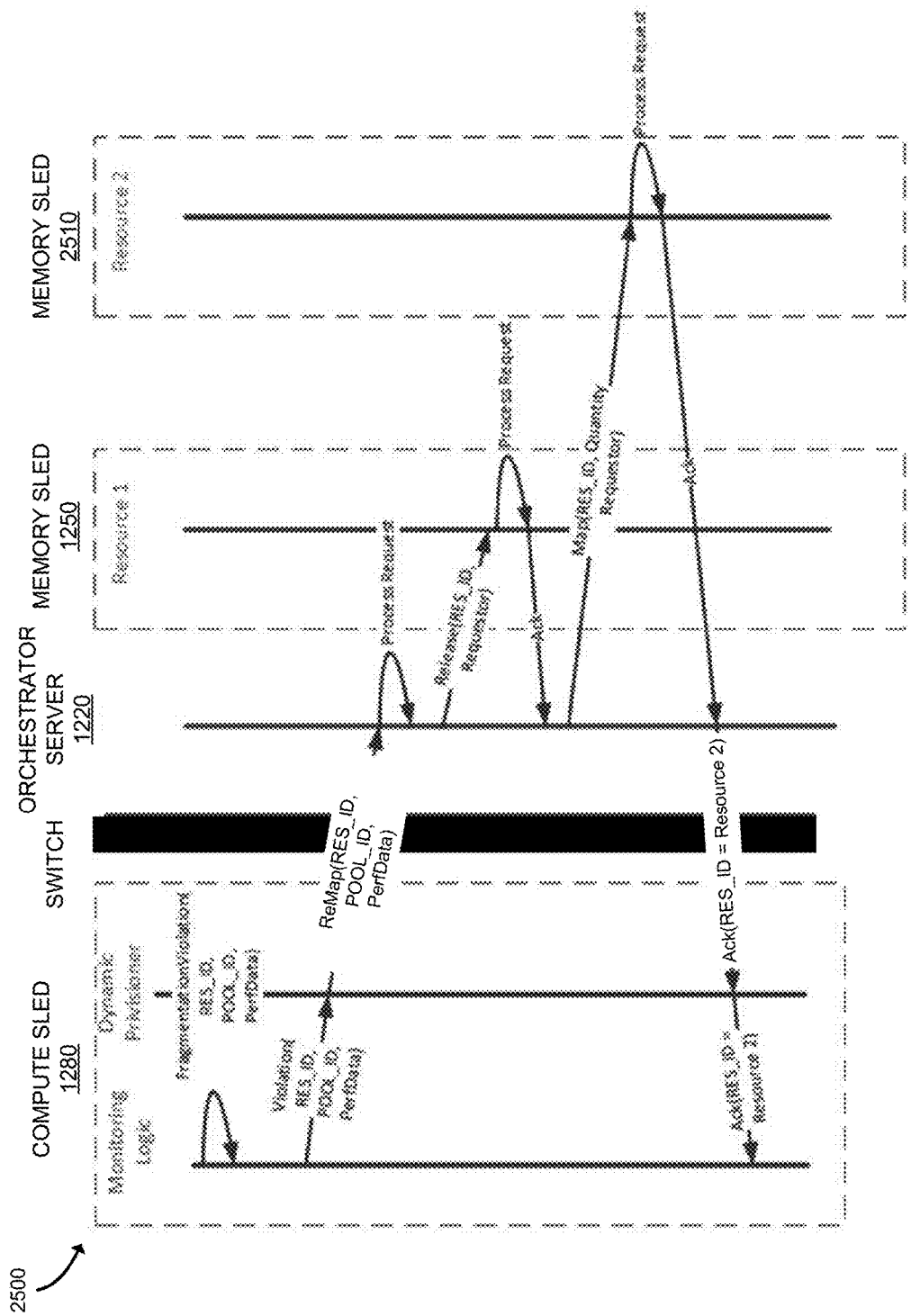
FIG. 25 is a simplified flow diagram of at least one embodiment of network communications to remap a memory tier from one memory sled to a different memory sled.

Referring now to FIG. 25, in a flow 2500 of network communications, the compute sled 1280 determines that a data fragmentation error has occurred when accessing data from the memory sled 1250 and sends a remap request to the orchestrator server 1220 to reassign another memory sled 2510 to Tier 1 in place of the memory sled memory sled 1250. In response, the orchestrator server 1220 sends adjusted memory tier allocation data 1506 to the memory sled 1250 to release it from Tier 1. The orchestrator server 1220 also sends adjusted memory tier allocation data 1506 to the memory sled 2510 to assign it to Tier 1 and to inform the memory sled 2510 of the memory to be allocated for each workload and of the identifiers of the memory sleds 1240 in the other tiers.

EXAMPLES

Illustrative examples of the technologies disclosed herein are provided below. An embodiment of the technologies may include any one or more, and any combination of, the examples described below.

Example 1 includes a compute device comprising one or more processors; and a memory having stored therein a plurality of instructions that, when executed by the one or more processors, cause the compute device to obtain target performance data indicative of a performance metric to be monitored and a corresponding performance threshold to be satisfied as a workload is executed; determine, as a function of the target performance data, memory tier allocation data indicative of an allocation of disaggregated memory sleds to tiers of performance, in which one memory sled of one tier is to act as a cache for another memory sled of a subsequent tier; send the memory tier allocation data and the target performance data to the corresponding memory sleds through a network; receive performance notification data from one of the memory sleds in the tiers, wherein the performance notification data is indicative of whether the memory sled has satisfied the performance threshold; and determine, in response to receipt of the performance notification data, an adjustment to the memory tier allocation data.

Example 2 includes the subject matter of Example 1, and wherein to determine the memory tier allocation data comprises to determine a memory sled for a primary tier to act as a cache for a subsequent tier as a function of types and amounts of memory available on the memory sleds.

Example 3 includes the subject matter of any of Examples 1 and 2, and wherein to determine a memory sled for a primary tier comprises to select a memory sled having a faster type of memory than the memory sled for the subsequent tier.

Example 4 includes the subject matter of any of Examples 1-3, and wherein to select a memory sled for the primary tier comprises to select a memory sled having available dynamic random access memory.

Example 5 includes the subject matter of any of Examples 1-4, and wherein to receive the performance notification data comprises to receive a performance notification that a memory sled has overperformed relative to the performance threshold.

Example 6 includes the subject matter of any of Examples 1-5, and wherein to receive the performance notification data comprises to receive a performance notification that a memory sled has underperformed relative to the performance threshold.

Example 7 includes the subject matter of any of Examples 1-6, and wherein to determine an adjustment to the memory tier allocation data comprises to reassign a tier from a first memory sled to a second memory sled, wherein the second memory sled has memory that is faster than the first memory sled.

Example 8 includes the subject matter of any of Examples 1-7, and wherein to determine an adjustment to the memory tier allocation data comprises to reassign a tier from a first memory sled to a second memory sled, wherein the second memory sled has memory that is slower than the first memory sled.

Example 9 includes the subject matter of any of Examples 1-8, and wherein to determine an adjustment to the memory tier allocation data comprises to change an amount of memory in a memory sled to be allocated to a workload.

Example 10 includes the subject matter of any of Examples 1-9, and wherein the plurality of instructions, when executed, further cause the compute device to send the adjusted memory tier allocation data to the memory sleds.

Example 11 includes the subject matter of any of Examples 1-10, and wherein to send the memory tier allocation data comprises to send an indication of the amount of memory to allocate for each of multiple workloads.

Example 12 includes the subject matter of any of Examples 1-11, and wherein to send the memory tier allocation data comprises to send identifiers of the memory sleds and the corresponding tiers to enable memory access requests to be routed from a memory sled in one tier to another memory sled in a subsequent tier.

Example 13 includes the subject matter of any of Examples 1-12, and wherein to receive the target performance data comprises to receive target performance data from a compute sled assigned to a workload.

Example 14 includes the subject matter of any of Examples 1-13, and wherein to receive the target performance data comprises to receive different performance thresholds for different workloads to be executed.

Example 15 includes the subject matter of any of Examples 1-14, and wherein to receive the target performance data comprises to receive a performance threshold indicative of a target number of cache misses per quantum of instructions executed.

Example 16 includes the subject matter of any of Examples 1-15, and wherein to receive the target performance data comprises to receive a performance threshold indicative of a target number of cycles per instruction.

Example 17 includes the subject matter of any of Examples 1-16, and wherein to receive the target performance data comprises to receive a performance threshold indicative of a target data access latency.

Example 18 includes a method for dynamically allocating tiers of disaggregated memory resources, the method comprising obtaining, by a compute device, target performance data indicative of a performance metric to be monitored and a corresponding performance threshold to be satisfied as a workload is executed; determining, by the compute device and as a function of the target performance data, memory tier allocation data indicative of an allocation of disaggregated memory sleds to tiers of performance, in which one memory sled of one tier is to act as a cache for another memory sled of a subsequent tier; sending, by the compute device, the memory tier allocation data and the target performance data to the corresponding memory sleds through a network; receiving, by the compute device, performance notification data from one of the memory sleds in the tiers, wherein the performance notification data is indicative of whether the memory sled has satisfied the performance threshold; and determining, by the compute device and in response to receipt of the performance notification data, an adjustment to the memory tier allocation data.

Example 19 includes the subject matter of Example 18, and wherein determining the memory tier allocation data comprises determining a memory sled for a primary tier to act as a cache for a subsequent tier as a function of types and amounts of memory available on the memory sleds.

Example 20 includes the subject matter of any of Examples 18 and 19, and wherein determining a memory sled for a primary tier comprises selecting a memory sled having a faster type of memory than the memory sled for the subsequent tier.

Example 21 includes the subject matter of any of Examples 18-20, and wherein selecting a memory sled for the primary tier comprises selecting a memory sled having available dynamic random access memory.

Example 22 includes the subject matter of any of Examples 18-21, and wherein receiving the performance notification data comprises receiving a performance notification that a memory sled has overperformed relative to the performance threshold.

Example 23 includes the subject matter of any of Examples 18-22, and wherein receiving the performance notification data comprises receiving a performance notification that a memory sled has underperformed relative to the performance threshold.

Example 24 includes the subject matter of any of Examples 18-23, and wherein determining an adjustment to the memory tier allocation data comprises reassigning a tier from a first memory sled to a second memory sled, wherein the second memory sled has memory that is faster than the first memory sled.

Example 25 includes the subject matter of any of Examples 18-24, and wherein determining an adjustment to the memory tier allocation data comprises reassigning a tier from a first memory sled to a second memory sled, wherein the second memory sled has memory that is slower than the first memory sled.

Example 26 includes the subject matter of any of Examples 18-25, and wherein determining an adjustment to the memory tier allocation data comprises changing an amount of memory in a memory sled to be allocated to a workload.

Example 27 includes the subject matter of any of Examples 18-26, and further including sending, by the compute device, the adjusted memory tier allocation data to the memory sleds.

Example 28 includes the subject matter of any of Examples 18-27, and wherein sending the memory tier allocation data comprises sending an indication of the amount of memory to allocate for each of multiple workloads.

Example 29 includes the subject matter of any of Examples 18-28, and wherein sending the memory tier allocation data comprises sending identifiers of the memory sleds and the corresponding tiers to enable memory access requests to be routed from a memory sled in one tier to another memory sled in a subsequent tier.

Example 30 includes the subject matter of any of Examples 18-29, and wherein receiving the target performance data comprises receiving target performance data from a compute sled assigned to a workload.

Example 31 includes the subject matter of any of Examples 18-30, and wherein receiving the target performance data comprises receiving different performance thresholds for different workloads to be executed.

Example 32 includes the subject matter of any of Examples 18-31, and wherein receiving the target performance data comprises receiving a performance threshold indicative of a target number of cache misses per quantum of instructions executed.

Example 33 includes the subject matter of any of Examples 18-32, and wherein receiving the target performance data comprises receiving a performance threshold indicative of a target number of cycles per instruction.

Example 34 includes the subject matter of any of Examples 18-33, and wherein receiving the target performance data comprises receiving a performance threshold indicative of a target data access latency.

Example 35 includes one or more machine-readable storage media comprising a plurality of instructions stored thereon that, in response to being executed, cause a compute device to perform the method of any of Examples 18-34.

Example 36 includes a compute device for dynamically allocating tiers of disaggregated memory resources, the compute device comprising one or more processors; one or more memory devices having stored therein a plurality of instructions that, when executed by the one or more processors, cause the compute device to perform the method of any of Examples 18-34.

Example 37 includes a compute device comprising means for obtaining target performance data indicative of a performance metric to be monitored and a corresponding performance threshold to be satisfied as a workload is executed; means for determining, as a function of the target performance data, memory tier allocation data indicative of an allocation of disaggregated memory sleds to tiers of performance, in which one memory sled of one tier is to act as a cache for another memory sled of a subsequent tier; means for sending the memory tier allocation data and the target performance data to the corresponding memory sleds through a network; means for receiving performance notification data from one of the memory sleds in the tiers, wherein the performance notification data is indicative of whether the memory sled has satisfied the performance threshold; and means for determining, in response to receipt of the performance notification data, an adjustment to the memory tier allocation data.

Example 38 includes the subject matter of Example 37, and wherein the means for determining the memory tier allocation data comprises means for determining a memory sled for a primary tier to act as a cache for a subsequent tier as a function of types and amounts of memory available on the memory sleds.

Example 39 includes the subject matter of any of Examples 37 and 38, and wherein the means for determining a memory sled for a primary tier comprises means for selecting a memory sled having a faster type of memory than the memory sled for the subsequent tier.

Example 40 includes the subject matter of any of Examples 37-39, and wherein the means for selecting a memory sled for the primary tier comprises means for selecting a memory sled having available dynamic random access memory.

Example 41 includes the subject matter of any of Examples 37-40, and wherein the means for receiving the performance notification data comprises means for receiving a performance notification that a memory sled has overperformed relative to the performance threshold.

Example 42 includes the subject matter of any of Examples 37-41, and wherein the means for receiving the performance notification data comprises means for receiving a performance notification that a memory sled has underperformed relative to the performance threshold.

Example 43 includes the subject matter of any of Examples 37-42, and wherein the means for determining an adjustment to the memory tier allocation data comprises means for reassigning a tier from a first memory sled to a second memory sled, wherein the second memory sled has memory that is faster than the first memory sled.

Example 44 includes the subject matter of any of Examples 37-43, and wherein the means for determining an adjustment to the memory tier allocation data comprises means for reassigning a tier from a first memory sled to a second memory sled, wherein the second memory sled has memory that is slower than the first memory sled.

Example 45 includes the subject matter of any of Examples 37-44, and wherein the means for determining an adjustment to the memory tier allocation data comprises means for changing an amount of memory in a memory sled to be allocated to a workload.

Example 46 includes the subject matter of any of Examples 37-45, and further including means for sending the adjusted memory tier allocation data to the memory sleds.

Example 47 includes the subject matter of any of Examples 37-46, and wherein the means for sending the memory tier allocation data comprises means for sending an indication of the amount of memory to allocate for each of multiple workloads.

Example 48 includes the subject matter of any of Examples 37-47, and wherein the means for sending the memory tier allocation data comprises means for sending identifiers of the memory sleds and the corresponding tiers to enable memory access requests to be routed from a memory sled in one tier to another memory sled in a subsequent tier.

Example 49 includes the subject matter of any of Examples 37-48, and wherein the means for receiving the target performance data comprises means for receiving target performance data from a compute sled assigned to a workload.

Example 50 includes the subject matter of any of Examples 37-49, and wherein the means for receiving the target performance data comprises means for receiving different performance thresholds for different workloads to be executed.

Example 51 includes the subject matter of any of Examples 37-50, and wherein the means for receiving the target performance data comprises means for receiving a performance threshold indicative of a target number of cache misses per quantum of instructions executed.

Example 52 includes the subject matter of any of Examples 37-51, and wherein the means for receiving the target performance data comprises means for receiving a performance threshold indicative of a target number of cycles per instruction.

Example 53 includes the subject matter of any of Examples 37-52, and wherein the means for receiving the target performance data comprises means for receiving a performance threshold indicative of a target data access latency.

Example 54 includes a memory sled for facilitating dynamic allocation of tiers of disaggregated memory resources, the memory sled comprising a memory; one or more processors coupled to the memory, wherein the one or more processors are to receive, from a compute device, memory tier allocation data indicative of an allocation of the memory sled and another memory sled to separate tiers of performance, in which one of the memory sleds is to act as a cache for the other memory sled; allocate the memory as a function of the memory tier allocation data; receive target performance data indicative of a target performance metric and an associated performance threshold to be satisfied in the execution of a workload; perform memory access operations in response to requests from a compute sled assigned to the workload; measure a performance metric of the allocated memory as the memory access operations are performed; determine whether the measured performance metric satisfies the performance threshold; and send, in response to a determination that the measured performance metric does not satisfy the performance threshold, a performance notification to the compute device, that the performance threshold is not satisfied.

Example 55 includes the subject matter of Example 54, and wherein the one or more processors are further to receive adjusted memory tier allocation data from the compute device and allocate the memory as a function of the adjusted memory tier allocation data.

Example 56 includes the subject matter of any of Examples 54 and 55, and wherein to perform memory access operations in response to requests from a compute sled assigned to a workload comprises to evict data to a subsequent tier and write data to the memory.

Example 57 includes the subject matter of any of Examples 54-56, and wherein to perform memory access operations in response to requests from a compute sled assigned to a workload comprises to determine that requested data is not in the memory and request the data from a subsequent tier.

Example 58 includes the subject matter of any of Examples 54-57, and wherein the one or more processors are further to associate the measured performance with phases of the workload; predict a future demand for memory operations from the workload as a function of the phases of the workload; and predict a change to the performance of the memory sled as a function of the predicted future demand.

Example 59 includes the subject matter of any of Examples 54-58, and wherein the one or more processors are further to adjust the measured performance by the predicted change in performance prior to the determination of whether the measured performance satisfies the performance threshold.

Example 60 includes the subject matter of any of Examples 54-59, and wherein to receive the memory tier allocation data comprises to receive identifications of memory sleds and associated tiers.

Example 61 includes the subject matter of any of Examples 54-60, and wherein to receive the memory tier allocation data comprises to receive an amount of memory of the memory sled to be allocated to a workload.

Example 62 includes the subject matter of any of Examples 54-61, and wherein to allocate the memory as a function of the memory tier allocation data comprises to establish a cache eviction policy and memory access routing rules as a function of the memory tier allocation data.

Example 63 includes the subject matter of any of Examples 54-62, and wherein to receive the target performance data comprises to receive a performance threshold indicative of a target number of cache misses per quantum of instructions executed.

Example 64 includes the subject matter of any of Examples 54-63, and wherein to receive the target performance data comprises to receive a performance threshold indicative of a target number of cycles per instruction.

Example 65 includes the subject matter of any of Examples 54-64, and wherein to receive the target performance data comprises to receive a performance threshold indicative of a target data access latency.

Example 66 includes the subject matter of any of Examples 54-65, and wherein to receive the target performance data comprises to receive different performance thresholds for different workloads.

Example 67 includes the subject matter of any of Examples 54-66, and wherein to receive the memory tier allocation data from a compute device comprises to receive the memory tier allocation data from an orchestrator server.

Example 68 includes a method for facilitating dynamic allocation of tiers of disaggregated memory resources, the memory sled comprising receiving, by the memory sled and from a compute device, memory tier allocation data indicative of an allocation of the memory sled and another memory sled to separate tiers of performance, in which one of the memory sleds is to act as a cache for the other memory sled; allocating, by the memory sled, a subset of memory of the memory sled as a function of the memory tier allocation data; receiving, by the memory sled, target performance data indicative of a target performance metric and an associated performance threshold to be satisfied in the execution of a workload; performing, by the memory sled, memory access operations in response to requests from a compute sled assigned to the workload; measuring, by the memory sled, a performance metric of the allocated memory as the memory access operations are performed; determining, by the memory sled, whether the measured performance metric satisfies the performance threshold; and sending, by the memory sled and in response to a determination that the measured performance metric does not satisfy the performance threshold, a performance notification to the compute device, that the performance threshold is not satisfied.

Example 69 includes the subject matter of Example 68, and further including receiving, by the memory sled, adjusted memory tier allocation data from the compute device and allocating the memory as a function of the adjusted memory tier allocation data.

Example 70 includes the subject matter of any of Examples 68 and 69, and wherein performing memory access operations in response to requests from a compute sled assigned to a workload comprises evicting data to a subsequent tier and writing data to the memory.

Example 71 includes the subject matter of any of Examples 68-70, and wherein performing memory access operations in response to requests from a compute sled assigned to a workload comprises determining that requested data is not in the memory of the present tier and requesting the data from a subsequent tier.

Example 72 includes the subject matter of any of Examples 68-71, and further including associating, by the memory sled, the measured performance with phases of the workload; predicting, by the memory sled, a future demand for memory operations from the workload as a function of the phases of the workload; and predicting, by the memory sled, a change to the performance of the memory sled as a function of the predicted future demand.

Example 73 includes the subject matter of any of Examples 68-72, and further including adjusting, by the memory sled, the measured performance by the predicted change in performance prior to the determination of whether the measured performance satisfies the performance threshold.

Example 74 includes the subject matter of any of Examples 68-73, and wherein receiving the memory tier allocation data comprises receiving identifications of memory sleds and associated tiers.

Example 75 includes the subject matter of any of Examples 68-74, and wherein receiving the memory tier allocation data comprises receiving an amount of memory of the memory sled to be allocated to a workload.

Example 76 includes the subject matter of any of Examples 68-75, and wherein allocating the memory as a function of the memory tier allocation data comprises establishing a cache eviction policy and memory access routing rules as a function of the memory tier allocation data.

Example 77 includes the subject matter of any of Examples 68-76, and wherein receiving the target performance data comprises receiving a performance threshold indicative of a target number of cache misses per quantum of instructions executed.

Example 78 includes the subject matter of any of Examples 68-77, and wherein receiving the target performance data comprises receiving a performance threshold indicative of a target number of cycles per instruction.

Example 79 includes the subject matter of any of Examples 68-78, and wherein receiving the target performance data comprises receiving a performance threshold indicative of a target data access latency.

Example 80 includes the subject matter of any of Examples 68-79, and wherein receiving the target performance data comprises receiving different performance thresholds for different workloads.

Example 81 includes the subject matter of any of Examples 68-80, and wherein receiving the memory tier allocation data from a compute device comprises receiving the memory tier allocation data from an orchestrator server.

Example 82 includes one or more machine-readable storage media comprising a plurality of instructions stored thereon that, in response to being executed, cause a memory sled to perform the method of any of Examples 68-81.

Example 83 includes a memory sled for facilitating dynamic allocation of tiers of disaggregated memory resources, the memory sled comprising a memory; one or more processors coupled to the memory, wherein the one or more processors are to perform the method of any of Examples 68-81.

Example 84 includes a memory sled comprising means for receiving, from a compute device, memory tier allocation data indicative of an allocation of the memory sled and another memory sled to separate tiers of performance, in which one of the memory sleds is to act as a cache for the other memory sled; means for allocating a subset of memory of the memory sled as a function of the memory tier allocation data; means for receiving target performance data indicative of a target performance metric and an associated performance threshold to be satisfied in the execution of a workload; means for performing memory access operations in response to requests from a compute sled assigned to the workload; means for measuring a performance metric of the allocated memory as the memory access operations are performed; means for determining whether the measured performance metric satisfies the performance threshold; and means for sending, in response to a determination that the measured performance metric does not satisfy the performance threshold, a performance notification to the compute device, that the performance threshold is not satisfied.

Example 85 includes the subject matter of Example 84, and further including means for receiving adjusted memory tier allocation data from the compute device and allocating the memory as a function of the adjusted memory tier allocation data.

Example 86 includes the subject matter of any of Examples 84 and 85, and wherein the means for performing memory access operations in response to requests from a compute sled assigned to a workload comprises means for evicting data to a subsequent tier and writing data to the memory.

Example 87 includes the subject matter of any of Examples 84-86, and wherein the means for performing memory access operations in response to requests from a compute sled assigned to a workload comprises means for determining that requested data is not in the memory of the present tier and requesting the data from a subsequent tier.

Example 88 includes the subject matter of any of Examples 84-87, and further including means for associating the measured performance with phases of the workload; means for predicting a future demand for memory operations from the workload as a function of the phases of the workload; and means for predicting a change to the performance of the memory sled as a function of the predicted future demand.

Example 89 includes the subject matter of any of Examples 84-88, and further including means for adjusting the measured performance by the predicted change in performance prior to the determination of whether the measured performance satisfies the performance threshold.

Example 90 includes the subject matter of any of Examples 84-89, and wherein the means for receiving the memory tier allocation data comprises means for receiving identifications of memory sleds and associated tiers.

Example 91 includes the subject matter of any of Examples 84-90, and wherein the means for receiving the memory tier allocation data comprises means for receiving an amount of memory of the memory sled to be allocated to a workload.

Example 92 includes the subject matter of any of Examples 84-91, and wherein the means for allocating the memory as a function of the memory tier allocation data comprises means for establishing a cache eviction policy and memory access routing rules as a function of the memory tier allocation data.

Example 93 includes the subject matter of any of Examples 84-92, and wherein the means for receiving the target performance data comprises means for receiving a performance threshold indicative of a target number of cache misses per quantum of instructions executed.

Example 94 includes the subject matter of any of Examples 84-93, and wherein the means for receiving the target performance data comprises means for receiving a performance threshold indicative of a target number of cycles per instruction.

Example 95 includes the subject matter of any of Examples 84-94, and wherein the means for receiving the target performance data comprises means for receiving a performance threshold indicative of a target data access latency.

Example 96 includes the subject matter of any of Examples 84-95, and wherein the means for receiving the target performance data comprises means for receiving different performance thresholds for different workloads.

Example 97 includes the subject matter of any of Examples 84-96, and wherein the means for receiving the memory tier allocation data from a compute device comprises means for receiving the memory tier allocation data from an orchestrator server.

The invention claimed is:
1. A compute device comprising:
   one or more processors; and a memory having stored therein a plurality of instructions that, when executed by the one or more processors, cause the compute device to:
obtain target performance data indicative of a performance metric to be monitored and a corresponding performance threshold to be satisfied as a workload is executed;
determine, as a function of the target performance data, memory tier allocation data indicative of an allocation of disaggregated memory sleds to tiers of performance, in which one memory sled of one tier is to act as a cache for another memory sled of a subsequent tier;
send the memory tier allocation data and the target performance data to the corresponding memory sleds through a network;
receive performance notification data from one of the memory sleds in the tiers, wherein the performance notification data is indicative of whether the memory sled has satisfied the performance threshold; and
determine, in response to receipt of the performance notification data, an adjustment to the memory tier allocation data.

2. The compute device of claim 1, wherein to determine the memory tier allocation data comprises to determine a memory sled for a primary tier to act as a cache for a subsequent tier as a function of types and amounts of memory available on the memory sleds.

3. The compute device of claim 2, wherein to determine a memory sled for a primary tier comprises to select a memory sled having a faster type of memory than the memory sled for the subsequent tier.

4. The compute device of claim 3, wherein to select a memory sled for the primary tier comprises to select a memory sled having available dynamic random access memory.

5. The compute device of claim 1, wherein to receive the performance notification data comprises to receive a performance notification that a memory sled has overperformed relative to the performance threshold.

6. The compute device of claim 1, wherein to receive the performance notification data comprises to receive a performance notification that a memory sled has underperformed relative to the performance threshold.

7. The compute device of claim 1, wherein to determine an adjustment to the memory tier allocation data comprises to reassign a tier from a first memory sled to a second memory sled, wherein the second memory sled has memory that is faster than the first memory sled.

8. The compute device of claim 1, wherein to determine an adjustment to the memory tier allocation data comprises to reassign a tier from a first memory sled to a second memory sled, wherein the second memory sled has memory that is slower than the first memory sled.

9. The compute device of claim 1, wherein to determine an adjustment to the memory tier allocation data comprises to change an amount of memory in a memory sled to be allocated to a workload.

10. The compute device of claim 1, wherein the plurality of instructions, when executed, further cause the compute device to send the adjusted memory tier allocation data to the memory sleds.

11. The compute device of claim 1, wherein to send the memory tier allocation data comprises to send an indication of the amount of memory to allocate for each of multiple workloads.

12. The compute device of claim 1, wherein to send the memory tier allocation data comprises to send identifiers of the memory sleds and the corresponding tiers to enable memory access requests to be routed from a memory sled in one tier to another memory sled in a subsequent tier.

13. One or more non-transitory, machine-readable storage media comprising a plurality of instructions stored thereon that, when executed by a compute device cause the compute device to:
obtain target performance data indicative of a performance metric to be monitored and a corresponding performance threshold to be satisfied as a workload is executed;
determine, as a function of the target performance data, memory tier allocation data indicative of an allocation of disaggregated memory sleds to tiers of performance, in which one memory sled of one tier is to act as a cache for another memory sled of a subsequent tier;
send the memory tier allocation data and the target performance data to the corresponding memory sleds through a network;
receive performance notification data from one of the memory sleds in the tiers, wherein the performance notification data is indicative of whether the memory sled has satisfied the performance threshold; and
determine, in response to receipt of the performance notification data, an adjustment to the memory tier allocation data.

14. The one or more non-transitory, machine-readable storage media of claim 13, wherein to determine the memory tier allocation data comprises to determine a memory sled for a primary tier to act as a cache for a subsequent tier as a function of types and amounts of memory available on the memory sleds.

15. The one or more non-transitory, machine-readable storage media of claim 14, wherein to determine a memory sled for a primary tier comprises to select a memory sled having a faster type of memory than the memory sled for the subsequent tier.

16. The one or more non-transitory, machine-readable storage media of claim 15, wherein to select a memory sled for the primary tier comprises to select a memory sled having available dynamic random access memory.

17. The one or more non-transitory, machine-readable storage media of claim 13, wherein to receive the performance notification data comprises to receive a performance notification that a memory sled has overperformed relative to the performance threshold.

18. The one or more non-transitory, machine-readable storage media of claim 13, wherein to receive the performance notification data comprises to receive a performance notification that a memory sled has underperformed relative to the performance threshold.

19. The one or more non-transitory, machine-readable storage media of claim 13, wherein to determine an adjustment to the memory tier allocation data comprises to reassign a tier from a first memory sled to a second memory sled, wherein the second memory sled has memory that is faster than the first memory sled.

20. The one or more non-transitory, machine-readable storage media of claim 13, wherein to determine an adjustment to the memory tier allocation data comprises to reassign a tier from a first memory sled to a second memory sled, wherein the second memory sled has memory that is slower than the first memory sled.

21. The one or more non-transitory, machine-readable storage media of claim 13, wherein to determine an adjustment to the memory tier allocation data comprises to change an amount of memory in a memory sled to be allocated to a workload.

22. The one or more non-transitory, machine-readable storage media of claim 13, wherein the plurality of instructions, when executed, further cause the compute device to send the adjusted memory tier allocation data to the memory sleds.

23. The one or more non-transitory, machine-readable storage media of claim 13, wherein to send the memory tier allocation data comprises to send an indication of the amount of memory to allocate for each of multiple workloads.

24. A method for dynamically allocating tiers of disaggregated memory resources, the method comprising:
obtaining, by a compute device, target performance data indicative of a performance metric to be monitored and a corresponding performance threshold to be satisfied as a workload is executed;
determining, by the compute device and as a function of the target performance data, memory tier allocation data indicative of an allocation of disaggregated memory sleds to tiers of performance, in which one memory sled of one tier is to act as a cache for another memory sled of a subsequent tier;
sending, by the compute device, the memory tier allocation data and the target performance data to the corresponding memory sleds through a network;
receiving, by the compute device, performance notification data from one of the memory sleds in the tiers, wherein the performance notification data is indicative of whether the memory sled has satisfied the performance threshold; and
determining, by the compute device and in response to receipt of the performance notification data, an adjustment to the memory tier allocation data.

25. The method of claim 24, wherein determining the memory tier allocation data comprises determining a memory sled for a primary tier to act as a cache for a subsequent tier as a function of types and amounts of memory available on the memory sleds.

* * * * *